US012403726B2

(12) United States Patent
Oizumi

(10) Patent No.: US 12,403,726 B2
(45) Date of Patent: Sep. 2, 2025

(54) TIRE

(71) Applicant: The Yokohama Rubber Co., LTD., Tokyo (JP)

(72) Inventor: Naoya Oizumi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 200 days.

(21) Appl. No.: 17/998,115

(22) PCT Filed: Feb. 25, 2021

(86) PCT No.: PCT/JP2021/007202
§ 371 (c)(1),
(2) Date: Nov. 7, 2022

(87) PCT Pub. No.: WO2021/229893
PCT Pub. Date: Nov. 18, 2021

(65) Prior Publication Data
US 2023/0173849 A1    Jun. 8, 2023

(30) Foreign Application Priority Data

May 12, 2020    (JP) .................................. 2020-083900

(51) Int. Cl.
*B60C 11/03*         (2006.01)
(52) U.S. Cl.
CPC ... *B60C 11/0306* (2013.01); *B60C 2011/0346* (2013.01); *B60C 2011/0353* (2013.01);
(Continued)

(58) Field of Classification Search
CPC ..... B60C 2011/1254; B60C 2011/0374; B60C 2011/0379; B60C 2011/0346; B60C 11/0318
See application file for complete search history.

(56) References Cited

U.S. PATENT DOCUMENTS 5,269,357 A * 12/1993 Killian ................ B60C 11/1369
152/903
2014/0238563 A1    8/2014 Tanaka
(Continued)

FOREIGN PATENT DOCUMENTS

CN    104002625 A    8/2014
CN    110509724 A    11/2019
(Continued)

*Primary Examiner* — Cedrick S Williams
(74) *Attorney, Agent, or Firm* — Thorpe North & Western

(57) ABSTRACT

In a tire, a main groove is formed in a step shape including circumferential extending portions extending in a circumferential direction at positions where positions in a width direction differ. Inclination directions of a second lug groove and a shoulder lug groove in the circumferential direction with respect to the width direction are opposite to one another. In the second lug grooves, two types of the second lug grooves having different inclination angles with respect to the width direction are alternately disposed. The second lug groove opens to the circumferential extending portion located close to the second lug groove among the circumferential extending portions included in respective center and shoulder main grooves formed in step shapes. A shoulder lug groove opens to the circumferential extending portion located close to the shoulder lug groove among the circumferential extending portions included in the shoulder main groove formed in the step shape.

23 Claims, 11 Drawing Sheets

(52) U.S. Cl.
CPC .............. *B60C 2011/0365* (2013.01); *B60C 2011/0372* (2013.01); *B60C 2200/14* (2013.01)

(56) References Cited

U.S. PATENT DOCUMENTS

| | | | |
|---|---|---|---|
| 2014/0283967 A1* | 9/2014 | Inoue | B60C 11/1236 152/209.18 |
| 2016/0089938 A1* | 3/2016 | Iwasaki | B60C 11/1236 152/209.18 |
| 2017/0239997 A1 | 8/2017 | Nishino | |
| 2018/0162172 A1* | 6/2018 | Oji | B60C 11/03 |
| 2018/0272809 A1 | 9/2018 | Kimura | |
| 2019/0359003 A1 | 11/2019 | Takano | |

FOREIGN PATENT DOCUMENTS

| | | | | |
|---|---|---|---|---|
| DE | 11 2015 003720 T5 | | 5/2017 | |
| EP | 2 620 299 A1 | | 6/2015 | |
| EP | 3 539 798 A1 | | 9/2019 | |
| JP | 64-22601 A | | 1/1989 | |
| JP | 02179508 A | * | 7/1990 | ......... B60C 11/0309 |
| JP | 06183214 A | * | 7/1994 | |
| JP | 2013049325 A | * | 3/2013 | |
| JP | 2013-173521 A | | 9/2013 | |
| JP | 2014-162439 A | | 9/2014 | |
| JP | 2017-121919 A | | 7/2017 | |
| JP | 2017-136998 A | | 8/2017 | |
| JP | 2017-140927 A | | 8/2017 | |
| JP | 2017-222280 A | | 12/2017 | |
| JP | 2018-75880 A | | 5/2018 | |
| JP | 2018-154280 A | | 10/2018 | |
| JP | 2019-202608 A | | 11/2019 | |

* cited by examiner

|  | Conventional Example 1 | Conventional Example 2 | Conventional Example 3 | Comparative Example 1 |
|---|---|---|---|---|
| Form of the main groove | Step | Step | Zigzag | Step |
| Inclination directions of second lug groove and shoulder lug groove | Opposite | Same | Opposite | Opposite |
| Presence of two types of second lug grooves having different inclination angles | No | No | No | Yes |
| Does lug groove open to circumferential extending portion of main groove located close to lug groove? | No | No | No | No |
| Offset amount Woff between circumferential extending portions/groove width Wgr of main groove | 0.25 | 0.25 | 0.25 | 1 |
| Width Ws of see-through portion of main groove (mm) | 5.5 | 5.5 | 5.5 | 0 |
| Angle $\theta 1$ of first second lug groove (°) | 30 | 30 | 30 | 40 |
| Angle $\theta 2$ of second second lug groove (°) | 30 | 30 | 30 | 45 |
| Side where groove width of first second lug groove widens | CL side | CL side | CL side | Same width |
| Side where groove width of second second lug groove widens | CL side | CL side | CL side | Same width |
| Side where groove depth of first second lug groove deepens | Same depth | Same depth | Same depth | Same depth |
| Side where groove depth of second second lug groove deepens | Same depth | Same depth | Same depth | Same depth |
| Groove width Wsh of shoulder main groove/groove width Wce of center main groove | 1.1 | 1.1 | 1.1 | 1.1 |
| Presence of chamfered portion of lug groove | No | No | No | No |
| Noise performance | 100 | 95 | 100 | 100 |
| Off-road performance | 100 | 100 | 95 | 100 |
| Chunking occurred | Large | Large | Large | Small |

FIG. 8A

| | Comparative Example 2 | Example 1 | Example 2 | Example 3 |
|---|---|---|---|---|
| Form of the main groove | Step | Step | Step | Step |
| Inclination directions of second lug groove and shoulder lug groove | Opposite | Opposite | Opposite | Opposite |
| Presence of two types of second lug grooves having different inclination angles | No | Yes | Yes | Yes |
| Does lug groove open to circumferential extending portion of main groove located close to lug groove? | Yes | Yes | Yes | Yes |
| Offset amount Woff between circumferential extending portions/groove width Wgr of main groove | 0.25 | 0.25 | 0.9 | 0.4 |
| Width Ws of see-through portion of main groove (mm) | 5.5 | 5.5 | 0.5 | 4.5 |
| Angle $\theta_1$ of first second lug groove (°) | 40 | 40 | 40 | 40 |
| Angle $\theta_2$ of second second lug groove (°) | 40 | 45 | 45 | 45 |
| Side where groove width of first second lug groove widens | Same width | Same width | Same width | Same width |
| Side where groove width of second second lug groove widens | Same width | Same width | Same width | Same width |
| Side where groove depth of first second lug groove deepens | Same depth | Same depth | Same depth | Same depth |
| Side where groove depth of second second lug groove deepens | Same depth | Same depth | Same depth | Same depth |
| Groove width Wsh of shoulder main groove/groove width Wce of center main groove | 1.1 | 1.1 | 1.1 | 1.1 |
| Presence of chamfered portion of lug groove | Yes | No | No | No |
| Noise performance | 100 | 103 | 103 | 103 |
| Off-road performance | 105 | 105 | 105 | 110 |
| Chunking occurred | Large | Large | Small | Small |

FIG. 8B

|  | Example 4 | Example 5 | Example 6 | Example 7 |
|---|---|---|---|---|
| Form of the main groove | Step | Step | Step | Step |
| Inclination directions of second lug groove and shoulder lug groove | Opposite | Opposite | Opposite | Opposite |
| Presence of two types of second lug grooves having different inclination angles | Yes | Yes | Yes | Yes |
| Does lug groove open to circumferential extending portion of main groove located close to lug groove? | Yes | Yes | Yes | Yes |
| Offset amount Woff between circumferential extending portions/groove width Wgr of main groove | 0.5 | 0.5 | 0.5 | 0.5 |
| Width Ws of see-through portion of main groove (mm) | 3.5 | 3.5 | 3.5 | 3.5 |
| Angle $\theta_1$ of first second lug groove (°) | 40 | 10 | 25 | 25 |
| Angle $\theta_2$ of second second lug groove (°) | 45 | 20 | 60 | 45 |
| Side where groove width of first second lug groove widens | Same width | Same width | Same width | Same width |
| Side where groove width of second second lug groove widens | Same width | Same width | Same width | Same width |
| Side where groove depth of first second lug groove deepens | Same depth | Same depth | Same depth | Same depth |
| Side where groove depth of second second lug groove deepens | Same depth | Same depth | Same depth | Same depth |
| Groove width Wsh of shoulder main groove/groove width Wce of center main groove | 1.1 | 1.1 | 1.1 | 1.1 |
| Presence of chamfered portion of lug groove | No | No | No | No |
| Noise performance | 105 | 105 | 110 | 107 |
| Off-road performance | 110 | 105 | 105 | 115 |
| Chunking occurred | Small | Small | Large | Small |

FIG. 8C

|  | Example 8 | Example 9 | Example 10 | Example 11 |
|---|---|---|---|---|
| Form of the main groove | Step | Step | Step | Step |
| Inclination directions of second lug groove and shoulder lug groove | Opposite | Opposite | Opposite | Opposite |
| Presence of two types of second lug grooves having different inclination angles | Yes | Yes | Yes | Yes |
| Does lug groove open to circumferential extending portion of main groove located close to lug groove? | Yes | Yes | Yes | Yes |
| Offset amount Woff between circumferential extending portions/groove width Wgr of main groove | 0.5 | 0.5 | 0.5 | 0.5 |
| Width Ws of see-through portion of main groove (mm) | 3.5 | 3.5 | 3.5 | 3.5 |
| Angle $\theta1$ of first second lug groove (°) | 25 | 25 | 25 | 25 |
| Angle $\theta2$ of second second lug groove (°) | 45 | 45 | 45 | 45 |
| Side where groove width of first second lug groove widens | Ground contact edge side | Ground contact edge side | Ground contact edge side | Ground contact edge side |
| Side where groove width of second second lug groove widens | CL side | CL side | CL side | CL side |
| Side where groove depth of first second lug groove deepens | Same depth | Ground contact edge side | Ground contact edge side | Ground contact edge side |
| Side where groove depth of second second lug groove deepens | Same depth | CL side | CL side | CL side |
| Groove width Wsh of shoulder main groove/groove width Wce of center main groove | 1.1 | 1.1 | 0.8 | 0.8 |
| Presence of chamfered portion of lug groove | No | No | No | Yes |
| Noise performance | 110 | 112 | 115 | 115 |
| Off-road performance | 115 | 115 | 115 | 115 |
| Chunking occurred | Small | Small | Small | No |

FIG. 8D

TIRE

TECHNICAL FIELD

The present technology relates to a tire.

BACKGROUND ART

A tire mounted on a vehicle has grooves in a tread surface, for example, to ensure various performances according to a use aspect of the tire, and the performances are improved by devising the shapes of the grooves. For example, in tires described in Japan Unexamined Patent Publication Nos. 2017-121919 A and 2017-136998 A, main grooves extending in a tire circumferential direction are formed in a zigzag shape, and lateral grooves extending in a tire axial direction communicate with the main grooves, thus ensuring on-snow performance, noise performance, and uneven wear resistance performance.

Here, some tires are mounted on a vehicle used for bad roads, and off-road performance as running performance in bad roads is required for the tires. In order to increase off-road performance, methods of increasing a groove area ratio and increasing edge components of grooves are often used. However, increasing the groove area ratio and increasing the edge components of the grooves possibly tend to increase noise generated while a tread contact surface is in contact with a ground. Thus, it has been very difficult to suppress noise while ensuring off-road performance.

SUMMARY

The present technology provides a tire that can provide off-road performance and noise performance in a compatible manner.

A tire according to an embodiment of the present technology includes four main grooves and a plurality of land portions. The four main grooves extend in a tire circumferential direction. The plurality of land portions are defined by the main grooves. The four main grooves include two center main grooves and two shoulder main grooves. The two center main grooves are disposed on both sides of a tire equatorial plane. The two shoulder main grooves are disposed on outer sides in a tire width direction of the two respective center main grooves. Each of the main grooves is formed in a step shape having circumferential extending portions extending in the tire circumferential direction at positions differing in the tire width direction. A second lug groove is disposed between the adjacent center main groove and shoulder main groove. The second lug groove extends in the tire width direction and has both ends opening to the center main groove and the shoulder main groove. A shoulder lug groove is disposed on the outer side in the tire width direction of the shoulder main groove. The shoulder lug groove extends in the tire width direction across a ground contact edge and has one end opening to the shoulder main groove. Inclination directions of the second lug groove and the shoulder lug groove in the tire circumferential direction with respect to the tire width direction are mutually opposite directions. In a plurality of the second lug grooves disposed side by side in the tire circumferential direction, two types of the second lug grooves having different inclination angles with respect to the tire width direction are alternately disposed. The second lug groove opening to the center main groove and the shoulder main groove opens to the circumferential extending portions located close to the second lug groove among the circumferential extending portions comprised in the respective center main groove and shoulder main groove formed in the step shapes. The shoulder lug groove opening to the shoulder main groove opens to the circumferential extending portion located close to the shoulder lug groove among the circumferential extending portions comprised in the shoulder main groove formed in the step shape.

Additionally, in the tire described above, the main groove preferably has an offset amount Woff in the tire width direction between the circumferential extending portions having the different positions in the tire width direction within a range $0.3 \le (\text{Woff}/\text{Wgr}) \le 0.8$ with respect to a groove width Wgr of the main groove.

Additionally, in the tire described above, the main groove preferably has a width Ws in the tire width direction of a see-through portion as a portion through which it is seen within a range 1 mm<Ws≤4 mm in an extension direction view of the main groove.

Additionally, in the tire described above, the second lug groove preferably includes a first second lug groove and a second second lug groove having mutually different inclination angles with respect to the tire width direction and disposed alternately in the tire circumferential direction. The first second lug groove preferably has an angle θ1 with respect to the tire width direction within a range 15°<θ1≤35°. The second second lug groove preferably has an angle θ2 with respect to the tire width direction within a range 25°≤θ2≤55°. The angle θ1 of the first second lug groove and the angle θ2 of the second second lug groove with respect to the tire width direction preferably satisfy θ1<θ2.

Additionally, in the tire described above, the first second lug groove preferably has a groove width that widens from an inner side in the tire width direction toward the outer side in the tire width direction. The second second lug groove preferably has a groove width that widens from the outer side in the tire width direction toward the inner side in the tire width direction.

Additionally, in the tire described above, the first second lug groove preferably has a groove depth that deepens from an inner side in the tire width direction toward the outer side in the tire width direction. The second second lug groove preferably has a groove depth that deepens from the outer side in the tire width direction toward the inner side in the tire width direction.

Additionally, in the tire described above, in the center main groove and the shoulder main groove, a relationship between a groove width Wce of the center main groove and a groove width Wsh of the shoulder main groove preferably satisfies Wce≥Wsh.

Additionally, in the tire described above, chamfered portions are preferably formed at edges of the second lug groove and the shoulder lug groove. The chamfered portion preferably has a width We within a range 0.3 mm≤We≤0.8 mm and a depth De within a range 0.3 mm≤De≤0.8 mm.

Additionally, in the tire described above, a plurality of the land portions preferably include a center land portion disposed between the two center main grooves, a second land portion disposed between the center main groove and the shoulder main groove adjacent in the tire width direction, and a shoulder land portion disposed on the outer side in the tire width direction of the shoulder main groove. In the center land portion, an open sipe having both ends opening to the center main grooves is preferably formed.

Additionally, in the tire described above, semi-closed sipes are preferably formed in the center land portion, the second land portion, and the shoulder land portion. The semi-closed sipes preferably have one end opening to the main grooves and an other end terminating in the land portions.

Additionally, in the tire described above, the semi-closed sipes preferably open to the main grooves with an inclination angle in the tire circumferential direction with respect to the tire width direction at an angle within a range of from 0° or more to 30° or less.

The tire according to the embodiment of the present technology has effects of allowing providing off-road performance and noise performance in a compatible manner.

BRIEF DESCRIPTION OF DRAWINGS

FIGS. 8A-8D are tables showing results of performance evaluation tests of pneumatic tires.

DETAILED DESCRIPTION

Tires according to embodiments of the present technology will be described in detail below with reference to the drawings. However, the present technology is not limited to the embodiment. Constituents of the following embodiments include elements that can be substituted and easily conceived of by a person skilled in the art or that are essentially identical.

Embodiments

In the following description, a description will be given using a pneumatic tire 1 as an example of the tire according to the embodiments of the present technology. The pneumatic tire 1 as an example of the tire can be inflated with any gas including air and inert gas, such as nitrogen.

Additionally, in the following description, the "tire radial direction" refers to a direction orthogonal to a tire rotation axis (not illustrated) which is a rotation axis of the pneumatic tire 1, the "inner side in the tire radial direction" refers to a side toward the tire rotation axis in the tire radial direction, and the "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equatorial line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below, "tire meridian section" refers to a cross-section of the tire taken along a plane that includes the tire rotation axis.

Figure 1:
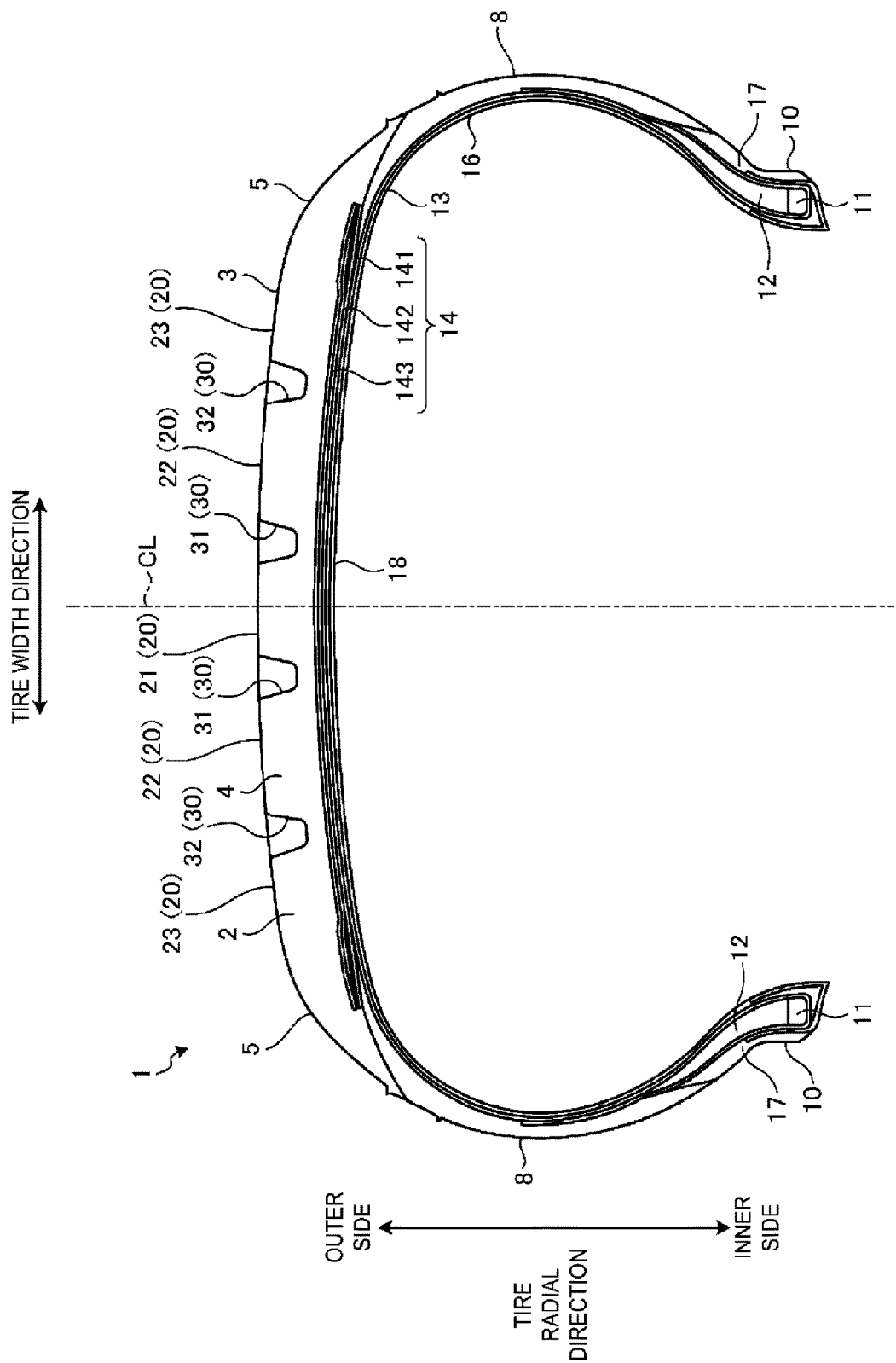
FIG. 1 is a tire meridian cross-sectional view illustrating a main portion of a pneumatic tire according to an embodiment.

FIG. 1 is a tire meridian cross-sectional view illustrating a main portion of the pneumatic tire 1 according to an embodiment. In the pneumatic tire 1 according to the present embodiment, a tread portion 2 is disposed on a portion on the outermost side in the tire radial direction when viewed in a tire meridian cross-section, and the tread portion 2 includes a tread rubber 4 made of a rubber composition. A surface of the tread portion 2, that is, a portion in contact with a road surface during traveling of a vehicle (not illustrated) having the pneumatic tires 1 mounted thereon is formed as a tread ground contact surface 3, and the tread ground contact surface 3 forms a part of a contour of the pneumatic tire 1. A plurality of main grooves 30 extending in the tire circumferential direction are formed in the tread ground contact surface 3 in the tread portion 2, and a plurality of land portions 20 are defined by the plurality of main grooves 30 on the surface of the tread portion 2.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. The bead portions 10 each include a bead core 11, and a bead filler 12 is provided in the outer side of the bead core 11 in the tire radial direction. The bead core 11 is an annular member formed by bundling bead wires, which are steel wires, and the bead filler 12 is a rubber member disposed in the outer side of the bead core 11 in the tire radial direction.

A belt layer 14 is disposed in the tread portion 2. The belt layer 14 is formed by a multilayer structure in which a plurality of belts 141, 142 and a belt cover 143 are layered, and the two layers of the belts 141, 142 are layered in the present embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, of 20° or more and 55° or less). Furthermore, the belt angles of the two layers of the belts 141, 142 differ from each another. Accordingly, the belt layer 14 is configured as a so-called crossply structure in which the two layers of the belts 141, 142 are layered with the inclination directions of the belt cords intersecting with each another. In other words, the two layers of the belts 141, 142 are provided as so-called cross belts in which the belt cords provided with the respective belts 141, 142 are disposed in mutually intersecting orientations.

The belt cover 143 is formed by rolling and covering, with coating rubber, a plurality of belt cover cords made from steel or an organic fiber material, such as polyester, rayon, or nylon, and a belt angle defined as an inclination angle of the belt cover cords with respect to the tire circumferential direction is within a predetermined range (for example, from 0° or more to 10° or less). Additionally, the belt cover 143 is, for example, a strip material formed by coating one or a plurality of belt cover cords with a coating rubber, where the strip material is formed by winding the strip material spirally around the tire rotation axis from the outer side in the tire radial direction of the two layers of the belts 141, 142.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present embodiment is configured as a so-called radial tire. The carcass layer 13 has a single layer structure made of one carcass ply or a multilayer structure made of a plurality of carcass plies, and spans between the pair of bead portions 10 disposed on both sides in the tire width direction in a toroidal shape to form a framework of the tire.

Specifically, the carcass layer 13 is disposed from one to the other of the pair of bead portions 10 located on both sides in the tire width direction and is turned back toward the outer side in the tire width direction along the bead cores 11 at the bead portions 10, wrapping around the bead cores 11 and the bead fillers 12. The bead filler 12 is a rubber member disposed in a space in the outer side of the bead core 11 in the tire radial direction, the space being formed by folding the carcass layer 13 back at the bead portion 10. Moreover, the belt layer 14 is disposed on the outer side in the tire radial direction of a portion, located in the tread portion 2, of the carcass layer 13 spanning between the pair of bead portions 10. The carcass ply of the carcass layer 13 is made by coating, with coating rubber, and rolling a plurality of carcass cords made from steel or an organic fiber material such as aramid, nylon, polyester, or rayon. The plurality of carcass cords forming the carcass ply is disposed in parallel at an angle in the tire circumferential direction, the angle with respect to the tire circumferential direction being along a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner portion side of the carcass layer 13 in the pneumatic tire 1. The innerliner 16 forms a tire inner surface 18 that is a surface on the inner side of the pneumatic tire 1.

Figure 2:
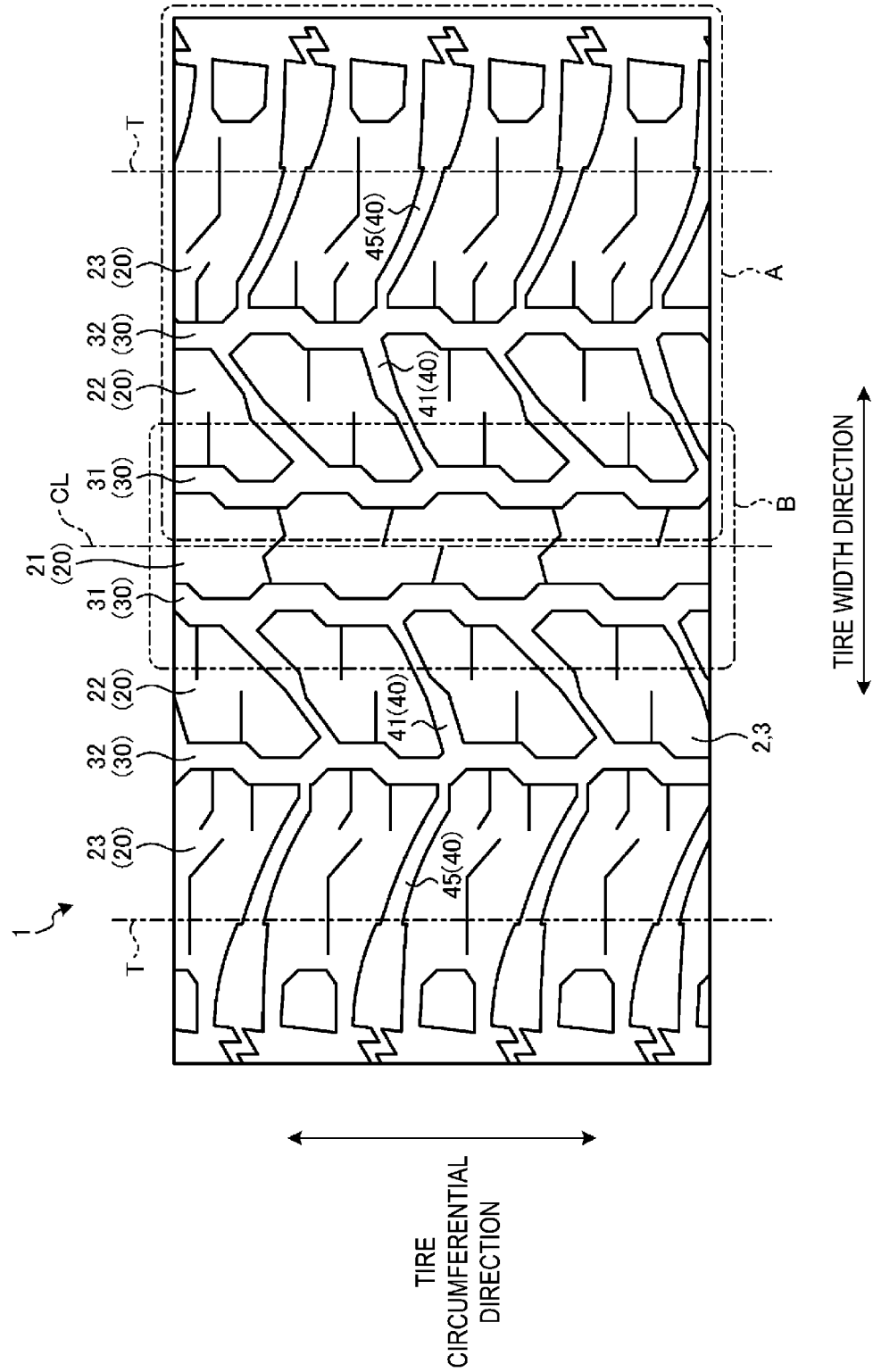
FIG. 2 is a plan view of a tread portion of the pneumatic tire illustrated in FIG. 1.

FIG. 2 is a plan view of the tread portion 2 of the pneumatic tire 1 illustrated in FIG. 1. The four main grooves 30 are formed in the tread portion 2 in the present embodiment. Among the four main grooves 30, the two main grooves 30 are disposed on each of both sides in the tire width direction of the tire equatorial plane CL. Thus, the four main grooves 30 are formed in the tire width direction side by side. In other words, the four main grooves 30 in total are formed in the tread portion 2, including: two center main grooves 31 disposed on both sides of the tire equatorial plane CL; and two shoulder main grooves 32 disposed on an outer side in the tire width direction of the two respective center main grooves 31.

Note that "main groove 30" refers to a vertical groove in which at least a part is extending in the tire circumferential direction. In general, the main groove 30 has a groove width 3 mm or more and a groove depth of 6 mm or more and has a tread wear indicator (slip sign) therein, indicating terminal stages of wear. In the present embodiment, the main groove 30 has a groove width of 5 mm or more and 8 mm or less and a groove depth of 8 mm or more and 9 mm or less, and an extension direction is substantially parallel to a tire equator line (centerline) where the tire equatorial plane CL and the tread ground contact surface 3 intersect.

The groove width is measured as the maximum value of a distance between groove walls opposed to each other in a groove opening portion when the tire is mounted on a specified rim, inflated to a specified internal pressure, and in an unloaded state. In a configuration in which the land portion includes a notch portion or a chamfered portion on an edge portion thereof, the groove width is measured with intersection points between the tread ground contact surface 3 and extension lines of the groove walls as measurement points, in a cross-sectional view with the groove length direction as a normal line direction. In a configuration in which the grooves extend in a zigzag shape or a wave shape in the tire circumferential direction, the groove width is measured with reference to the center line of the oscillation of the groove walls as measurement points.

The groove depth is measured as the maximum value of a distance from the tread ground contact surface 3 to the groove bottom when the tire is mounted on a specified rim, inflated to the specified internal pressure, and in an unloaded state. Additionally, in a configuration in which the grooves include a partially uneven portion or sipe on the groove bottom, the groove depth is measured excluding these portions.

The plurality of land portions 20 defined by the main grooves 30 include a center land portion 21, second land portions 22, and shoulder land portions 23. Among them, the center land portion 21 is disposed between the two center main grooves 31, is located on the tire equatorial plane CL, and has both sides in the tire width direction defined by the center main grooves 31. Additionally, the second land portion 22 is located between the center main groove 31 and the shoulder main groove 32 adjacent in the tire width direction, is disposed on the outer side in the tire width direction of the center land portion 21, and has both sides in the tire width direction defined by the center main groove 31 and the shoulder main groove 32. Further, the shoulder land portion 23 is disposed on the outer side in the tire width direction of the shoulder main groove 32 and is disposed adjacent to the second land portion 22 via the shoulder main groove 32, and the inner side in the tire width direction of the shoulder land portion 23 is defined by the shoulder main groove 32.

Additionally, a plurality of lug grooves 40 extending in the tire width direction are formed in the tread ground contact surface 3 of the tread portion 2, and the lug grooves 40 include second lug grooves 41 and shoulder lug grooves 45. In the present embodiment, the lug groove 40 has a groove width within the range of from 1.6 mm or more to 6 mm or less, and a groove depth within the range of from 4 mm or more to 7 mm or less. Among the second lug groove 41 and the shoulder lug groove 45, the second lug groove 41 is disposed between the adjacent center main groove 31 and shoulder main groove 32, extends in the tire width direction, and has both ends opening to the center main groove 31 and the shoulder main groove 32. Additionally, the shoulder lug groove 45 is disposed on the outer side in the tire width direction of the shoulder main groove 32, extends in the tire width direction across a ground contact edge T, and has one end opening to the shoulder main groove 32.

The ground contact edge T here refers to both outermost edges of a region contacting a flat plate on the tread ground contact surface 3 in the tire width direction when the pneumatic tire 1 is mounted on a specified rim, inflated to a specified internal pressure, placed perpendicular to the flat plate in a stationary state, and loaded with a load corresponding to a specified load and continues in the tire circumferential direction. Here, the specified rim refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Moreover, the specified internal pressure refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO. The specified load refers to a "maximum load capacity" defined by JATMA, a maximum value in "TIRE LOAD LIMITS AT VARIOUS COLD INFLATION PRESSURES" defined by TRA, or a "LOAD CAPACITY" defined by ETRTO.

Among the land portions 20 defined by the main grooves 30, the second land portion 22 having both sides in the tire width direction defined by the center main groove 31 and the shoulder main groove 32 has both sides in the tire circumferential direction defined by the second lug grooves 41 adjacent in the tire circumferential direction. Since both ends of the second lug groove 41 open to the center main groove 31 and the shoulder main groove 32, the second land portion 22 having both sides in the tire circumferential direction defined by the second lug grooves 41 is formed as the block-shaped land portion 20.

Additionally, the shoulder land portion 23 defined by the shoulder main groove 32 at the inner side in the tire width direction has both sides in the tire circumferential direction defined by the shoulder lug grooves 45 adjacent in the tire circumferential direction. Since the shoulder lug groove 45 extends in the tire width direction across the ground contact edge T, the shoulder land portion 23 having both sides in the tire circumferential direction defined by the shoulder lug grooves 45 is formed in a block shape at least the portion on the inner side in the tire width direction of the ground contact edge T.

On the other hand, the center land portion 21 having both sides in the tire width direction defined by the center main grooves 31 is formed as the rib-like land portion 20 in which the land portion 20 is formed continuously in the tire circumferential direction without being divided by the lug grooves 40.

Figure 3:
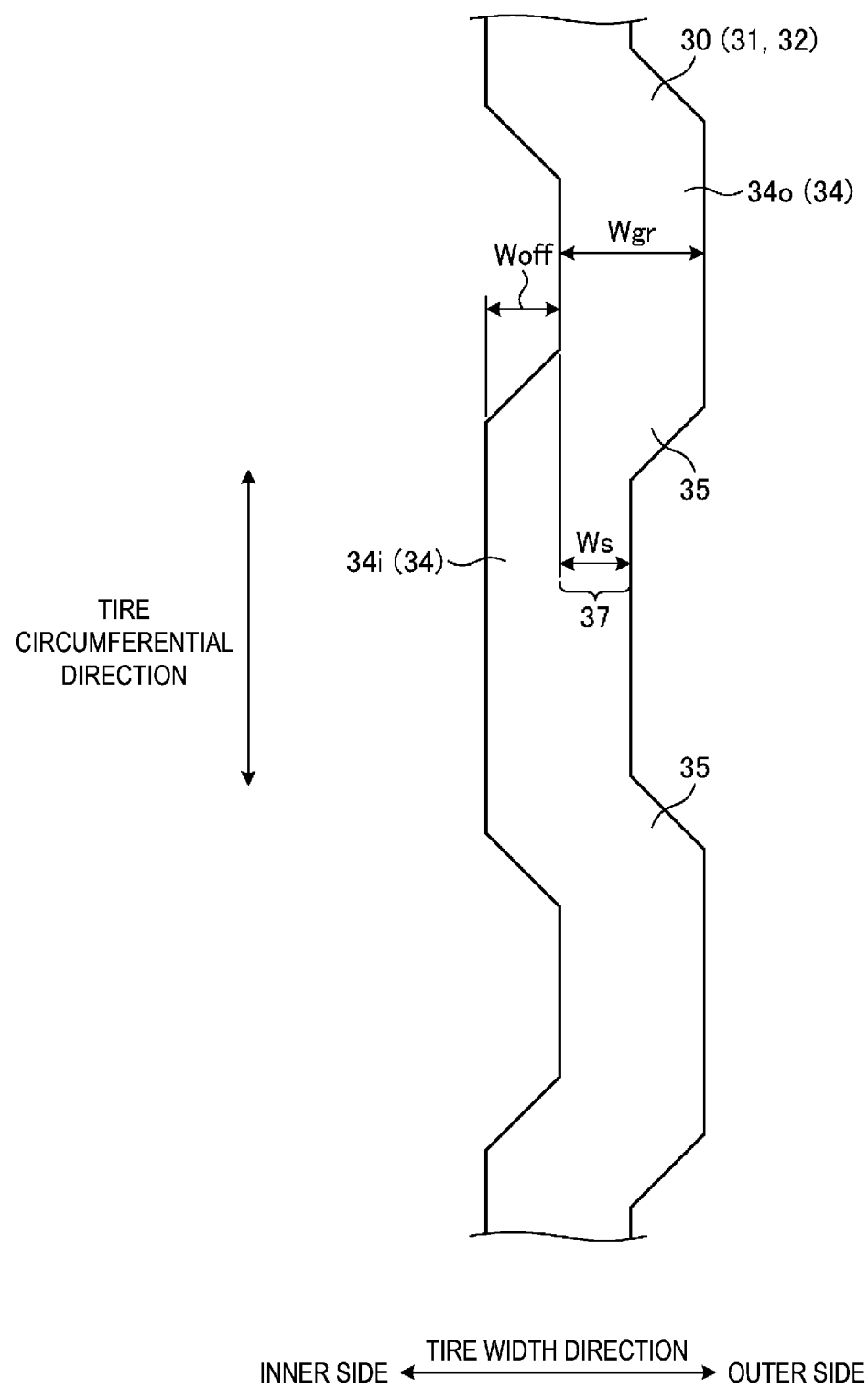
FIG. 3 is a detailed view of a main groove illustrated in FIG. 2.

FIG. 3 is a detailed view of the main groove 30 illustrated in FIG. 2. The four main grooves 30, the two center main grooves 31 and the two shoulder main grooves 32, are disposed in the tread portion 2. The respective main grooves 30 are formed in step shapes including circumferential extending portions 34 extending in the tire circumferential direction at positions where positions in the tire width direction differ. The step shape here refers to a shape in which a center line indicating a center in a groove width direction forms a rectangular wave or a trapezoidal wave to oscillate. In other words, the main groove 30 includes the two types of the circumferential extending portions 34 having mutually different positions in the tire width direction. The two types of the circumferential extending portions 34 are disposed alternately in the tire circumferential direction, and end portions of the different circumferential extending portions 34 adjacent in the tire circumferential direction are connected by a connection portion 35. The connection portion 35 also constitutes the main groove 30.

The two types of the circumferential extending portions 34 include, for example, a plurality of inner circumferential extending portions 34$i$ and a plurality of outer circumferential extending portions 34$o$ located on the outer side in the tire width direction of the inner circumferential extending portion 34$i$, and the inner circumferential extending portion 34$i$ and the outer circumferential extending portion 34$o$ are disposed alternately in the tire circumferential direction. In the inner circumferential extending portion 34$i$ and the outer circumferential extending portion 34$o$, the inner circumferential extending portions 34$i$ have the same position at positions in the tire width direction, and the outer circumferential extending portions 34$o$ have the same position at positions in the tire width direction.

Additionally, the connection portion 35 connects the approaching end portions of the inner circumferential extending portion 34$i$ and the outer circumferential extending portion 34$o$ adjacent in the tire circumferential direction. In the present embodiment, the connection portion 35 is formed so as to extend and be inclined in the tire circumferential direction with respect to the tire width direction. Thus, in the present embodiment, the main groove 30 formed in the step shape is formed in the so-called trapezoidal wave shape.

Thus, in the main groove 30 including the inner circumferential extending portions 34$i$, the outer circumferential extending portions 34$o$, and the connection portions 35, in one main groove 30, groove widths Wgr of the inner circumferential extending portion 34$i$, the outer circumferential extending portion 34$o$, and the connection portion 35 are substantially constant.

Thus, the main groove 30 formed in the step shape by the circumferential extending portions 34 and the connection portions 35 has an offset amount Woff in the tire width direction between the circumferential extending portions 34 having the different positions in the tire width direction within the range $0.3 \leq (Woff/Wgr) \leq 0.8$ with respect to the groove width Wgr of the main groove 30. The offset amount Woff in this case is, for example, a distance in the tire width direction between edges on the same side in the tire width direction of the inner circumferential extending portion 34$i$ and the outer circumferential extending portion 34$o$.

Additionally, the main groove 30 has a width Ws in the tire width direction of a see-through portion 37 as a portion through which it is seen within the range $1\ mm < Ws \leq 4\ mm$ in the extension direction view of the main groove 30. In this case, when viewing the inside of the main groove 30 in the extension direction of the main groove 30, the see-through portion 37 is a portion that can be seen through without being blocked by a groove wall forming the main groove 30, and the width Ws of the see-through portion 37 is the width in the tire width direction of the portion that can be seen through in this manner.

Figure 4:
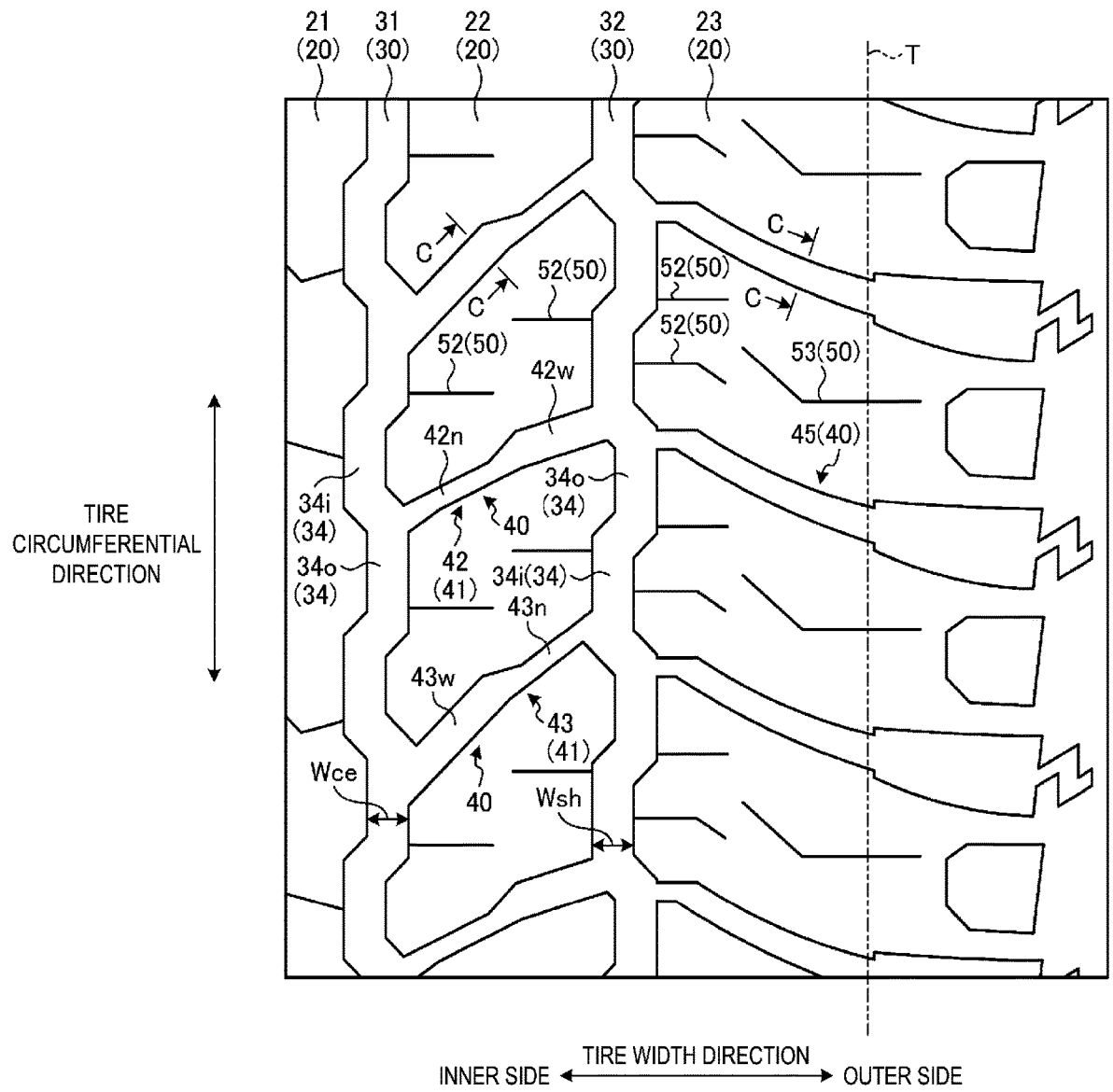
FIG. 4 is a detailed view of a portion A of FIG. 2.

FIG. 4 is a detailed view of a portion A of FIG. 2. The four main grooves 30, the two center main grooves 31 and the two shoulder main grooves 32, are formed in the tread portion 2. The center main groove 31 and the shoulder main groove 32 have different groove widths, and the center main groove 31 has the groove width equal to or more than the groove width of the shoulder main groove 32. That is, in the center main groove 31 and the shoulder main groove 32, the relationship between a groove width Wce of the center main groove 31 and a groove width Wsh of the shoulder main groove 32 satisfies Wce≥Wsh. Note that the relationship between the groove width Wce of the center main groove 31 and the groove width Wsh of the shoulder main groove 32 is preferably within the range 0.6≤(Wsh/Wce)≤0.9.

The lug groove 40 opens to the main groove 30 thus formed. The lug groove 40 opens to the circumferential extending portion 34 on the side where the lug groove 40 opening to the main groove 30 is located in the tire width direction among the two types of the circumferential extending portions 34 included in the main groove 30. For example, the second lug groove 41 opening to the center main groove 31 and the shoulder main groove 32 opens to the circumferential extending portion 34 located close to the second lug groove 41 among the circumferential extending portions 34 included in the respective center main groove 31 and shoulder main groove 32 formed in the step shapes. In other words, with respect to the center main groove 31, since the second lug groove 41 opens to the center main groove 31 from the outer side in the tire width direction, the second lug groove 41 opens to the outer circumferential extending portion 34$o$ included in the center main groove 31. In addition, with respect to the shoulder main groove 32, since the second lug groove 41 opens to the shoulder main groove 32 from the inner side in the tire width direction, the second lug groove 41 opens to the inner circumferential extending portion 34$i$ included in the shoulder main groove 32.

Also, the shoulder lug groove 45 opening to the shoulder main groove 32 opens to the circumferential extending portion 34 located close to the shoulder lug groove 45 among the circumferential extending portions 34 included in the shoulder main groove 32 formed in the step shape. That is, with respect to the shoulder main groove 32, since the shoulder lug groove 45 opens to the shoulder main groove 32 from the outer side in the tire width direction, the shoulder lug groove 45 opens to the outer circumferential extending portion 34$o$ included in the shoulder main groove 32. The second lug groove 41 and the shoulder lug groove 45 opening from the inner side and the outer side in the tire width direction of the shoulder main groove 32 with respect to the shoulder main groove 32 open to the different circumferential extending portions 34, and thus open at different positions in the tire circumferential direction with respect to the shoulder main groove 32.

Thus, each of the second lug groove 41 and the shoulder lug groove 45 opening to the main groove 30 is formed to be inclined in the tire circumferential direction with respect to the tire width direction while extending in the tire width direction. Then, the inclination directions of the second lug groove 41 and the shoulder lug groove 45 in the tire circumferential direction with respect to the tire width direction are directions opposite to one another. For example, when the second lug groove 41 and the shoulder lug groove 45 extend from the inner side in the tire width direction toward the outer side in the tire width direction, both of them are formed to be inclined in the tire circumferential direction while extending in the tire width direction, but the directions of the second lug groove 41 and the shoulder lug groove 45 toward the tire circumferential direction are directions opposite to one another.

In addition, in the plurality of second lug grooves 41 disposed side by side in the tire circumferential direction, the two types of the second lug grooves 41 having different inclination angles with respect to the tire width direction are alternately disposed. That is, the second lug grooves 41 include a first second lug groove 42 and a second second lug groove 43 having mutually different inclination angles with respect to the tire width direction and disposed alternately in the tire circumferential direction. Thus, in the second land portion 22 having both sides in the tire circumferential direction defined by the second lug grooves 41 adjacent in the tire circumferential direction has both sides in the tire circumferential direction defined by the first second lug groove 42 and the second second lug groove 43 adjacent in the tire circumferential direction.

Figure 5:
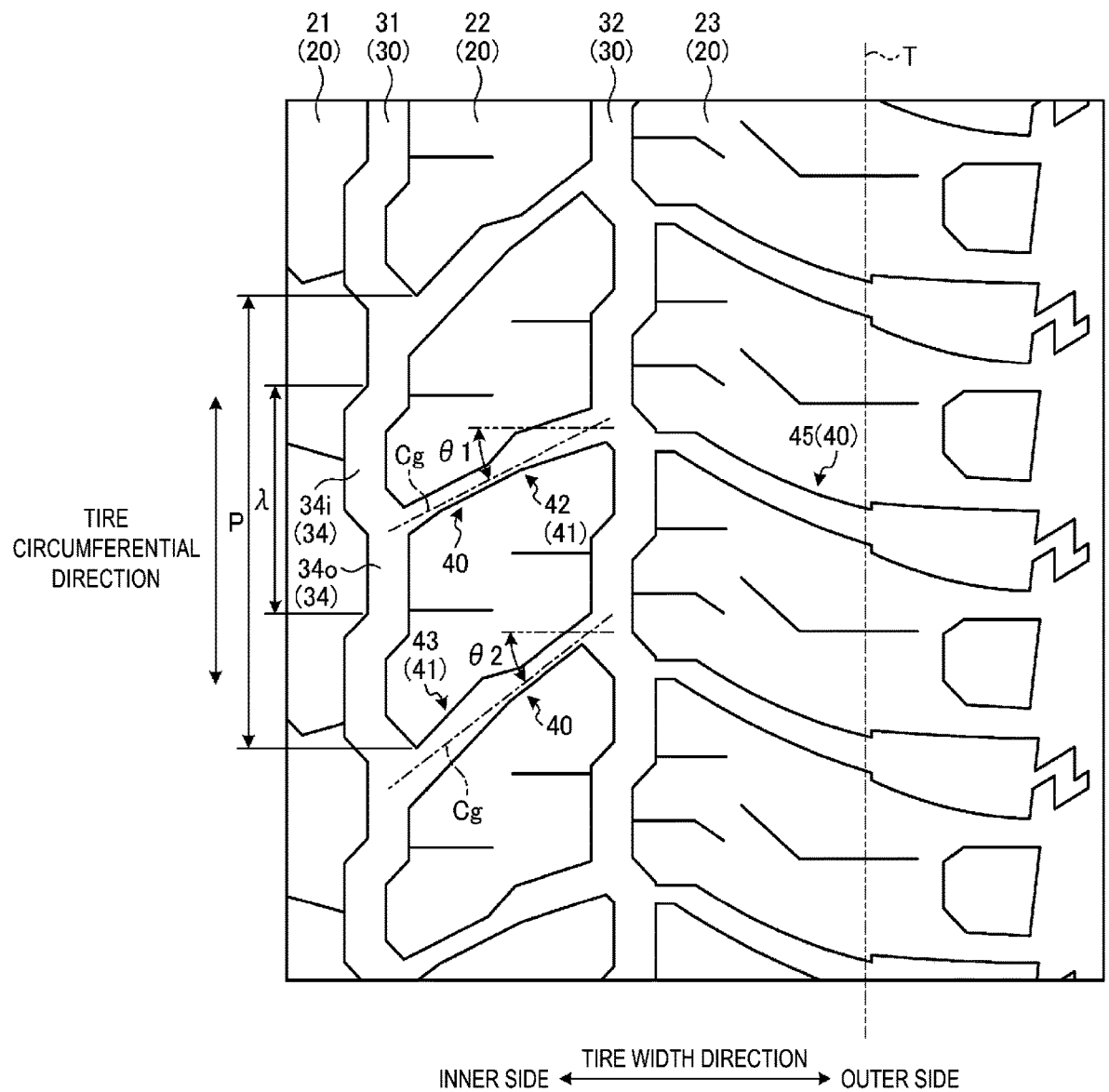
FIG. 5 is a detailed view of the portion A of FIG. 2, and is an explanatory diagram regarding value specification of second lug grooves.

FIG. 5 is a detailed view of the portion A of FIG. 2, and is an explanatory diagram regarding value specification of the second lug grooves 41. Among the first second lug groove 42 and the second second lug groove 43, the first second lug groove 42 has an angle $\theta 1$ of an inclination in the tire circumferential direction with respect to the tire width direction within the range 15°<$\theta 1$≤35°. The second second lug groove 43 has an angle $\theta 2$ of an inclination in the tire circumferential direction with respect to the tire width direction within the range 25°≤$\theta 2$≤55. Furthermore, the angle $\theta 1$ of the first second lug groove 42 and the angle $\theta 2$ of the second second lug groove 43 with respect to the tire width direction satisfy $\theta 1$<$\theta 2$. That is, the second second lug groove 43 has the inclination angle in the tire circumferential direction with respect to the tire width direction larger than that of the first second lug groove 42.

Note that in this case, the inclination angles $\theta 1$, $\theta 2$ of the first second lug groove 42 and the second second lug groove 43 are angles of straight lines Cg connecting centers of groove widths at end portions on both sides in the tire width direction of the first second lug groove 42 and the second second lug groove 43.

The first second lug groove 42 and the second second lug groove 43 are formed so as to change the groove widths depending on the positions in the tire width direction. Specifically, the first second lug groove 42 has the monotonically increasing groove width from the inner side in the tire width direction toward the outer side in the tire width direction. That is, as illustrated in FIG. 4, the first second lug groove 42 has a width narrowed portion 42$n$ located close to the center main groove 31 and a width widened portion 42$w$ located close to the shoulder main groove 32, and the width widened portion 42$w$ has a groove width wider than that of the width narrowed portion 42$n$. In this way, the first second lug groove 42 has the width widened portion 42$w$ having the groove width wider than that of the width narrowed portion 42$n$ on the outer side in the tire width direction of the width narrowed portion 42$n$, and thus the first second lug groove 42 has the groove width that widens from the inner side in the tire width direction toward the outer side in the tire width direction.

Conversely, the second second lug groove 43 has the monotonically increasing groove width from the outer side in the tire width direction toward the inner side in the tire width direction. That is, the second second lug groove 43 has a width narrowed portion 43$n$ located close to the shoulder main groove 32 and a width widened portion 43$w$ located close to the center main groove 31, and the width widened portion 43$w$ has a groove width wider than that of the width narrowed portion 43$n$. In this way, the second second lug groove 43 has the width widened portion 43$w$ having the groove width wider than that of the width narrowed portion 43$n$ on the inner side in the tire width direction of the width narrowed portion 43$n$, and thus the second second lug groove 43 has the groove width that widens from the outer side in the tire width direction toward the inner side in the tire width direction.

Since the first second lug groove 42 and the second second lug groove 43 disposed alternately in the tire circumferential direction are thus formed, the ways of change in groove widths with respect to the tire width direction are in directions opposite to one another between the first second lug groove 42 and the second second lug groove 43. In other words, the first second lug groove 42 has the groove width that widens from the tire equatorial plane CL side toward the ground contact edge T side, and the second second lug groove 43 has the groove width that widens from the ground contact edge T side toward the tire equatorial plane CL side, and thus the ways of change in groove widths with respect to the tire width direction are in the directions opposite to one another.

Further, the first second lug groove 42 and the second second lug groove 43 are formed such that the groove depths change depending on the positions in the tire width direction. Specifically, in the first second lug groove 42, the groove depth at the position of the width widened portion 42w, which is disposed on the outer side in the tire width direction of the width narrowed portion 42n, is deeper than the groove depth at the position of the width narrowed portion 42n. Thus, the first second lug groove 42 has the groove depth that deepens from the inner side in the tire width direction toward the outer side in the tire width direction.

Also, in the second second lug groove 43, the groove depth at the position of the width widened portion 43w, which is disposed on the inner side in the tire width direction of the width narrowed portion 43n, is deeper than the groove depth at the position of the width narrowed portion 43n. Thus, the second second lug groove 43 has the groove depth that deepens from the outer side in the tire width direction toward the inner side in the tire width direction. Thus, in the first second lug groove 42 and the second second lug groove 43, the ways of change in groove depths with respect to the tire width direction are in the directions opposite to one another.

Both of the center main groove 31 and the shoulder main groove 32 to which the second lug groove 41 opens are formed in the step shape due to the inner circumferential extending portion 34i and the outer circumferential extending portion 34o being alternately disposed in the tire circumferential direction. A relationship between a wavelength λ (FIG. 5) of the step shapes of the main grooves 30 and a pitch length P (FIG. 5) of the second lug grooves 41 is within the range $0.4 \leq (\lambda/P) \leq 0.6$.

In this case, the wavelength λ of the step shape of the main groove 30 is the length in the tire circumferential direction of one cycle of the step shape formed by disposing the inner circumferential extending portions 34i and the outer circumferential extending portions 34o alternately in the tire circumferential direction. For example, the wavelength λ of the step shape of the main groove 30 is a distance in the tire circumferential direction between the end portions on the same side in the tire circumferential direction of the inner circumferential extending portions 34i adjacent in the tire circumferential direction, and a distance in the tire circumferential direction between the end portions on the same side in the tire circumferential direction of the outer circumferential extending portions 34o adjacent in the tire circumferential direction.

Also, the pitch length P of the second lug grooves 41 is a distance in the tire circumferential direction between the first second lug grooves 42 adjacent via the second second lug groove 43 or between the second second lug grooves 43 adjacent via the first second lug groove 42 in the first second lug grooves 42 and the second second lug grooves 43 disposed alternately in the tire circumferential direction.

Figure 7:
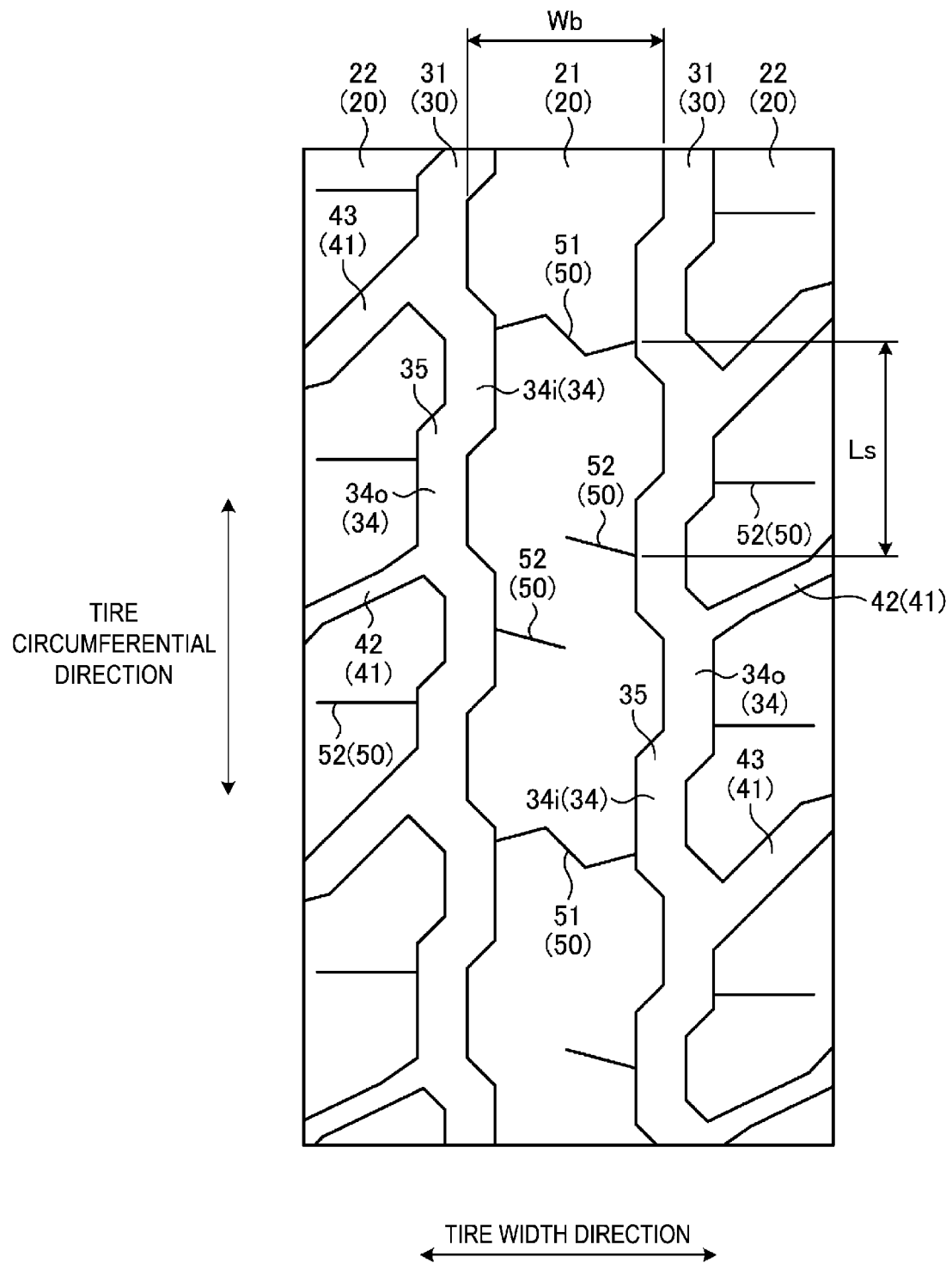
FIG. 7 is a detailed view of a portion B of FIG. 2.

Also, sipes 50 are formed in each of the land portions 20 defined by the main grooves 30 and the lug grooves 40 (see FIGS. 4 and 7). The sipes 50 described herein are formed in a narrow groove shape in the tread ground contact surface 3. In the sipes 50, when the pneumatic tire 1 is mounted on a specified rim, inflated in an internal pressure condition at a specified internal pressure, and in an unloaded state, wall surfaces constituting the narrow groove do not contact one another, whereas in a case where the narrow groove is located in a portion of the ground contact surface formed on a flat plate in response to application of a load on the flat plate in the vertical direction or in a case where the land portion 20 including the narrow groove flexes, the wall surfaces constituting the narrow groove or at least parts of portions provided on the wall surface contact one another due to deformation of the land portion 20. In the present embodiment, the sipe 50 has a groove width of 1.5 mm or less, and a maximum depth from the tread ground contact surface 3 is within the range of from 5 mm or more to 8 mm or less.

The sipes 50 are formed in a configuration of an open sipe 51 (see FIG. 7) having both ends in a length direction opening to the main groove 30, a semi-closed sipe 52 (see FIGS. 4 and 7) having one end opening to the main groove 30 and the other end terminating in the land portion 20, and a closed sipe 53 (see FIG. 4) having both ends terminating in the land portion 20. For example, the open sipes 51 having both ends opening to the center main grooves 31 are formed in the center land portion 21 (see FIG. 7). Additionally, in the center land portion 21, the second land portion 22, and the shoulder land portion 23, the semi-closed sipes 52 having one end opening to the main grooves 30 and the other end terminating in the land portions 20 are formed (see FIGS. 4 and 7). Furthermore, the shoulder land portion 23 includes the closed sipes 53 having both ends terminating in the shoulder land portion 23 (see FIG. 4).

Figure 6:
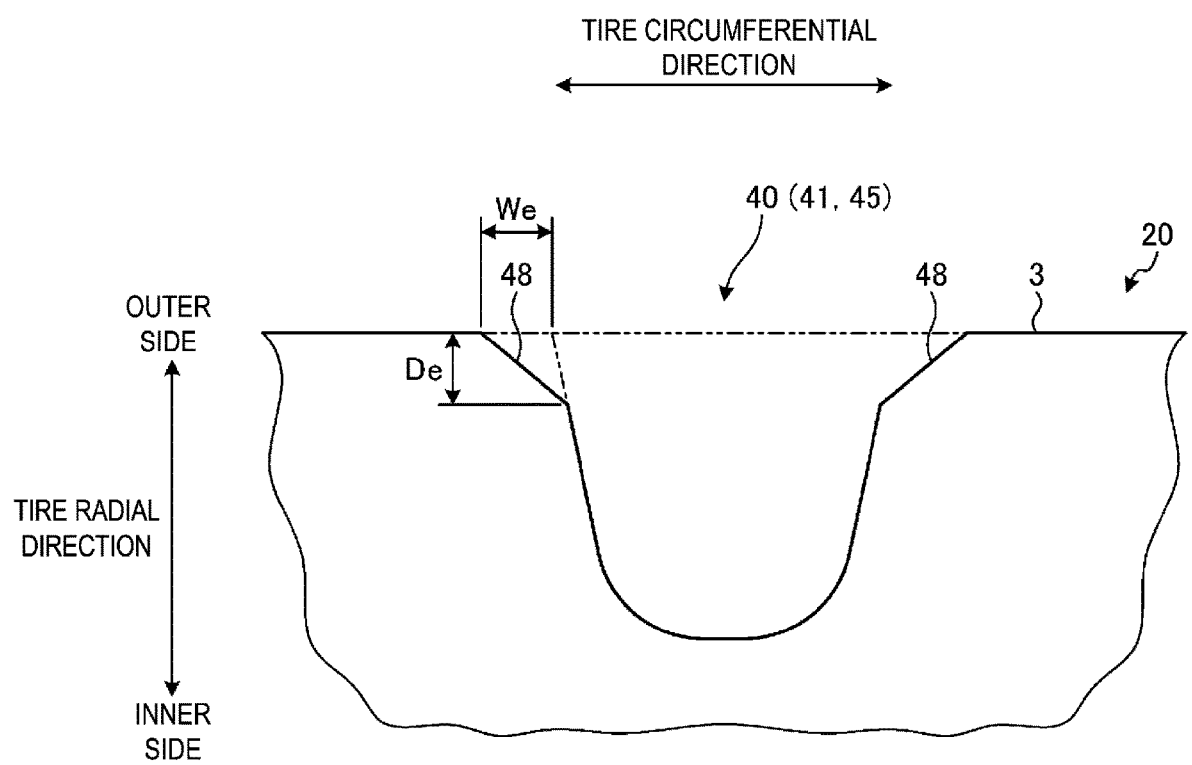
FIG. 6 is a cross-sectional view along line C-C in FIG. 4.

FIG. 6 is a cross-sectional view along line C-C in FIG. 4. A chamfered portion 48 is formed at an edge of an opening portion to the tread ground contact surface 3 in each of the lug grooves 40. In other words, in the second lug groove 41 and the shoulder lug groove 45, the chamfered portions 48 are formed at the edges of the portions defined by the second lug groove 41 and the shoulder lug groove 45 in the land portions 20. The chamfered portions 48 formed at the edges of the opening portions of the second lug groove 41 and the shoulder lug groove 45 have a width We within the range $0.3 \text{ mm} \leq We \leq 0.8 \text{ mm}$ and a depth De within the range $0.3 \text{ mm} \leq De \leq 0.8 \text{ mm}$. In this case, the width We of the chamfered portion 48 is the width of the chamfered portion 48 in the groove width direction of the second lug groove 41 or the shoulder lug groove 45. Also, the depth De of the chamfered portion 48 is the depth of the chamfered portion 48 in the direction of the groove depth of the second lug groove 41 or the shoulder lug groove 45.

FIG. 7 is a detailed view of a portion B of FIG. 2. The open sipe 51 formed in the center land portion 21 extends in the tire width direction across both ends in the tire width direction of the center land portion 21 and has both ends opening to the respective inner circumferential extending portions 34i of the center main grooves 31. Note that in the present embodiment, the open sipe 51 formed in the center land portion 21 extends in the tire width direction while bending in the tire circumferential direction at two locations.

The semi-closed sipes 52 formed in the center land portion 21 include the semi-closed sipe 52 opening to one center main groove 31 and the semi-closed sipe 52 opening to the other center main groove 31 among the two center main grooves 31 that define both sides in the tire width direction of the center land portion 21. Thus, the semi-closed sipe 52 formed in the center land portion 21 is formed so as to have one end opening to the center main groove 31 and the other end terminating in the center land portion 21. Similar to the open sipe 51, the end portion on the side opening to the center main groove 31 of the semi-closed sipe 52, which has one end opening to the center main groove 31, opens to the inner circumferential extending portion 34i of the center main groove 31.

In addition, in the semi-closed sipes 52 formed in the center land portion 21, when the two semi-closed sipes 52 located between the open sipes 51 adjacent in the tire circumferential direction and opening to the different center main grooves 31 are defined as one set, the open sipe 51 and one set of the semi-closed sipes 52 are disposed alternately in the tire circumferential direction. Additionally, one set of the semi-closed sipes 52 formed in the center land portion 21, that is, the two semi-closed sipes 52 adjacent in the tire circumferential direction, are formed so as not to have portions where the positions in the tire width direction are the same positions. That is, the two semi-closed sipes 52 adjacent in the tire circumferential direction are formed without an overlap in the tire circumferential direction.

In addition, in the open sipe 51 and the semi-closed sipe 52 thus formed in the center land portion 21, a distance Ls in the tire circumferential direction between the open sipe 51 and the semi-closed sipe 52 mutually disposed at the closest positions is within the range $0.5 \leq (Ls/Wb) \leq 1.2$ with respect to a ground contact width Wb of the center land portion 21. In this case, the ground contact width Wb of the center land portion 21 is a maximum width in the tire width direction of the center land portion 21, and specifically, is a distance in the tire width direction between the edges on the sides of defining the center land portion 21 of the outer circumferential extending portions 34o of the center main grooves 31 that define both sides in the tire width direction of the center land portion 21. Also, the distance Ls in the tire circumferential direction between the open sipe 51 and the semi-closed sipe 52 disposed at the positions closest to one another is the distance in the tire circumferential direction between the opening portion to the center main groove 31 of the semi-closed sipe 52 and the opening portion to the same center main groove 31 of the open sipe 51.

Also, in the semi-closed sipes 52 (FIG. 4) formed in the second land portion 22, the semi-closed sipe 52 opening to the center main groove 31 and the semi-closed sipe 52 opening to the shoulder main groove 32 are disposed between the first second lug groove 42 and the second second lug groove 43 that define both sides in the tire circumferential direction of the second land portion 22. In other words, in the semi-closed sipes 52 formed in the second land portion 22, one semi-closed sipe 52 opening to the center main groove 31 and one semi-closed sipe 52 opening to the shoulder main groove 32 are disposed in each of the second land portions 22 formed in the block shape.

Among them, the semi-closed sipe 52 opening to the center main groove 31 and formed in the second land portion 22 has one end opening to the outer circumferential extending portion 34o in the center main groove 31, and the other end terminating in the second land portion 22. Additionally, the semi-closed sipe 52 opening to the shoulder main groove 32 and formed in the second land portion 22 has one end opening to the inner circumferential extending portion 34i in the shoulder main groove 32, and the other end terminating in the second land portion 22.

Additionally, the respective semi-closed sipe 52 opening to the center main groove 31 and formed in the second land portion 22 and semi-closed sipe 52 opening to the shoulder main groove 32 and formed in the second land portion 22 are formed so as not to have portions where the positions in the tire width direction are the same positions. That is, the two semi-closed sipes 52 formed in one second land portion 22 and opening to the different main grooves 30 are formed without an overlap in the tire circumferential direction.

Additionally, the two semi-closed sipes 52 (FIG. 4) formed in the shoulder land portion 23 are disposed between the shoulder lug grooves 45 adjacent in the tire circumferential direction, and the two semi-closed sipes 52 have one end opening to the shoulder main groove 32 and the other end terminating in the shoulder land portion 23. Among the two semi-closed sipes 52 disposed between the shoulder lug grooves 45, one semi-closed sipe 52 opens to the outer circumferential extending portion 34o in the shoulder main groove 32, and the other semi-closed sipe 52 opens to the inner circumferential extending portion 34i in the shoulder main groove 32.

Thus, the semi-closed sipes 52 formed in the respective land portions 20 of the center land portion 21, the second land portion 22, and the shoulder land portions 23 open to the main grooves 30 with the inclination angle in the tire circumferential direction with respect to the tire width direction at an angle within the range of from 0° or more to 30° or less. In the present embodiment, among the semi-closed sipes 52, the semi-closed sipes 52 (FIG. 7) opening to the center main grooves 31 different from one another and formed in the center land portion 21 have the same inclination direction in the tire circumferential direction with respect to the tire width direction and the inclination angles of substantially the same size.

Additionally, in the semi-closed sipes 52 (FIG. 4) formed in the second land portion 22, both of the semi-closed sipe 52 opening to the center main groove 31 and the semi-closed sipe 52 opening to the shoulder main groove 32 have the inclination angles in the tire circumferential direction with respect to the tire width direction of approximately 0°.

Also, in the semi-closed sipes 52 (FIG. 4) formed in the shoulder land portion 23, both of the two semi-closed sipes 52 disposed between the shoulder lug grooves 45 adjacent in the tire circumferential direction open with respect to the shoulder lug grooves 45 with the inclination angle in the circumferential direction with respect to the tire width direction of approximately 0°. Additionally, among the semi-closed sipes 52 formed in the shoulder land portion 23 and opening to the shoulder lug groove 45, the semi-closed sipe 52 on the side opening to the inner circumferential extending portion 34i of the shoulder lug groove 45 is bent at a position in the middle in the length direction of the semi-closed sipe 52.

Further, the closed sipe 53 (FIG. 4) formed in the shoulder land portion 23 is formed so as to extend in the tire width direction across the ground contact end T, and is bent in the middle in the length direction of the closed sipe 53.

In this manner, the respective semi-closed sipes 52 and closed sipes 53 formed in the shoulder land portion 23 are formed so as not to have portions where the positions in the tire width direction are the same positions. That is, the semi-closed sipes 52 and the closed sipes 53 formed in one shoulder land portion 23 are formed without an overlap in the tire circumferential direction.

The pneumatic tire 1 according to the present embodiment is used, for example, by being mounted on a vehicle that probably performs off-road travel. In the event of mounting the pneumatic tire 1 on a vehicle, the pneumatic tire 1 is mounted on a rim wheel and inflated with air inside to an inflated state, and then mounted to the vehicle. When the vehicle on which the pneumatic tires 1 are mounted travels, the pneumatic tires 1 rotate while, in the tread ground contact surface 3 on the tread portion 2, the portion of the tread ground contact surface 3 located at the bottom comes into contact with the road surface. When the vehicle on which the pneumatic tires 1 are mounted travels on a dry road surface, the vehicle travels mainly by transferring a driving force and a braking force to the road surface and generating a turning force by friction forces between the tread ground contact surface 3 and the road surface. When the vehicle travels on a wet road surface, the vehicle travels in such a way that water between the tread ground contact surface 3 and the road surface enters grooves, such as the main grooves 30 and the lug grooves 40, and the sipe 50, and the water between the tread ground contact surface 3 and the road surface is drained through these grooves. As a result, the tread ground contact surface 3 easily contacts the road surface, and the vehicle can travel by the friction force between the tread ground contact surface 3 and the road surface.

Additionally, although the vehicle possibly travels on a so-called off-road, which is an unpaved road, the second lug grooves 41 and the shoulder lug grooves 45 opening to the main grooves 30 are formed in the tread portion 2, and further the shoulder lug grooves 45 are formed across the ground contact edge T. Thus, for example, during travel on a road surface having fluid mud on its surface, such as a mud road, the mud entering the second lug groove 41 and the shoulder lug groove 45 can be discharged to the main groove 30, and the mud entering the shoulder lug groove 45 can be discharged to the outer side in the tire width direction of the ground contact edge T. This makes it possible to increase a contact with the ground of the tread ground contact surface 3, and traction performance during off-road travel can be ensured.

Additionally, since the main groove 30 is formed in the step shape, a resistance in the tire circumferential direction against the mud that has entered the inside of the main groove 30 during off-road travel, such as a mud road, can be provided. In this way, traction performance during off-road travel can be more reliably ensured.

Also, the second lug grooves 41 and the shoulder lug grooves 45 open to the circumferential extending portions 34 located on the sides where the respective lug grooves 40 open in the tire width direction with respect to the main grooves 30 formed in the step shapes in this manner. Thus, the rigidity of the land portions 20 defined by the main grooves 30 and the lug grooves 40 can be ensured, and steering stability can be ensured regardless of the traveling road surface.

In addition, although there is a road surface with many recesses/protrusions, such as a rocky area, in off-road, a posture of the vehicle becomes unstable on the road surface with many recesses/protrusions, and a ground contact area between the tread ground contact surface 3 and the road surface decreases, and thus, a drive wheel idles when a driving force is transferred in some cases. In this way, in the case where the drive wheel idles during traveling in a rocky area, when a pointed portion of a rock enters the inside of the main groove 30, the pneumatic tire 1 rotates while the rock keeps contacting the groove bottom of the main groove 30.

In this case, when the main groove 30 extends straight in the tire circumferential direction, the pneumatic tire 1 rotates while keeping the state in which the rock contacts the groove bottom of the main groove 30, and thus a rubber of the groove bottom of the main groove 30 is damaged by the rock, and possibly causes cracks in the groove bottom of the main groove 30.

In contrast, in the present embodiment, the main groove 30 is formed in the step shape including the circumferential extending portions 34 extending in the tire circumferential direction at the positions where the positions in the tire width direction differ. Thus, when a pointed portion of a rock enters the main groove 30, the pointed portion enters the circumferential extending portion 34 of the main groove 30 in many cases. When the drive wheel idles in the state, the rock abuts on the end portion in the tire circumferential direction of the circumferential extending portion 34. In other words, the rock abuts on the portion defined by the end portions in the tire circumferential direction of the circumferential extending portions 34 in the land portions 20. As a result, the rock that has entered the main groove 30 is discharged from the main groove 30. Thus, entrance of a rock into the main groove 30 and rotation of the pneumatic tire 1 in a state where the rock keeps contacting the groove bottom of the main groove 30 can be suppressed. Accordingly, damage of the rubber of the groove bottom of the main groove 30 by the rock can be suppressed, and cracks in the groove bottom of the main groove 30 can be suppressed.

Additionally, since the main groove 30 is formed in the step shape, formation of a large number of portions where the rigidity of the land portions 20 decrease can be suppressed, as in the case where, for example, the shape of the main groove 30 is formed in a zigzag shape oscillating in the tire width direction while extending in the tire circumferential direction in order to discharge the pointed portion of the rock from the main groove 30. Thus, the rigidity of the land portions 20 can be ensured, and steering stability can be more reliably ensured regardless of the traveling road surface.

Additionally, since the inclination directions of the second lug groove 41 and the shoulder lug groove 45 are the mutually opposite directions, when a sound generated while the tread ground contact surface 3 contacts the ground is transmitted to the second lug groove 41 and the shoulder lug groove 45 and comes out of the outer side in the tire width direction of the ground contact edge T, the sound can be less likely to transmit between the second lug groove 41 and the shoulder lug groove 45. This makes it possible to increase noise performance, which is the performance of making it difficult to generate a sound during rotation of the pneumatic tire 1. Furthermore, in the plurality of second lug grooves 41 disposed side by side in the tire circumferential direction, the two types of the second lug grooves 41 having the different inclination angles with respect to the tire width direction are disposed alternately, and thus, a frequency of a sound generated while the second land portions 22 defined by the second lug grooves 41 contact the ground can be dispersed. Thus, amplification of the sound at a specific frequency and an increase in sound volume can be suppressed, and noise performance can be more reliably enhanced. Consequently, off-road performance and noise performance can be provided in a compatible manner.

In addition, the main groove 30 has the offset amount Woff in the tire width direction between the circumferential extending portions 34 having the different positions in the tire width direction within the range $0.3 \leq (Woff/Wgr) \leq 0.8$ with respect to the groove width Wgr of the main groove 30.

Thus, while wet performance is ensured, cracks in the groove bottom of the main groove 30 can be more reliably suppressed. In other words, when the offset amount Woff between the circumferential extending portions 34 of the main groove 30 is (Woff/Wgr)<0.3 with respect to the groove width Wgr of the main groove 30, the offset amount Woff between the circumferential extending portions 34 is too small. Thus, when the drive wheel idles with the pointed portion of the rock entering the inside of the main groove 30, the rock is possibly difficult to be discharged from the main groove 30. In this case, the pneumatic tire 1 rotates in a state where the rock keeps contacting the groove bottom of the main groove 30, and cracks in the groove bottom of the main groove 30 are possibly difficult to be suppressed. In addition, when the offset amount Woff between the circumferential extending portions 34 of the main groove 30 is (Woff/Wgr) >0.8 with respect to the groove width Wgr of the main groove 30, the offset amount Woff between the circumferential extending portions 34 is too large. Thus, when water flows in the main groove 30 during traveling on wet road surfaces, the water is possibly less likely to flow in the main groove 30. In this case, the water between the tread ground contact surface 3 and the road surface is difficult to be drained, and thus wet performance, which is the running performance on wet road surfaces, is possibly difficult to be ensured.

In contrast, when the offset amount Woff between the circumferential extending portions 34 of the main groove 30 is within the range 0.3≤(Woff/Wgr)≤0.8 with respect to the groove width Wgr of the main groove 30, while ease of flow of water when the water enters the main groove 30 is ensured, a discharge property of a rock when a pointed portion of the rock enters the inside of the main groove 30 can be ensured. Thus, while wet performance is ensured, cracks in the groove bottom of the main groove 30 can be more reliably suppressed. As a result, while wet performance is ensured, durability during off-road travel can be improved.

Additionally, the width Ws in the tire width direction of the see-through portion 37 of the main groove 30 is within the range 1 mm<Ws≤4 mm. Thus, while wet performance is ensured, cracks in the groove bottom of the main groove 30 can be more reliably suppressed. In other words, in a case where the width Ws of the see-through portion 37 of the main groove 30 is Ws≤1 mm, the width Ws of the see-through portion 37 is too small, and the ease of flow of water in the main groove 30 decreases. Thus, drainage properties in the main groove 30 decrease, and wet performance is possibly difficult to be ensured. In addition, in a case where the width Ws of the see-through portion 37 of the main groove 30 is Ws>4 mm, the width Ws of the see-through portion 37 is too large. Thus, when the pneumatic tire 1 rotates in a state where a pointed portion of a rock enters the main groove 30, the rock is possibly difficult to be discharged from the main groove 30. In this case, since the pneumatic tire 1 continues rotating while the pointed portion of the rock contacts the groove bottom of the main groove 30, cracks in the groove bottom of the main groove 30 are possibly difficult to be suppressed.

In contrast, when the width Ws of the see-through portion 37 of the main groove 30 is within the range 1 mm<Ws≤4 mm, while ease of flow of water when the water enters the main groove 30 is ensured, a discharge property of a rock when a pointed portion of the rock enters the inside of the main groove 30 can be ensured. Thus, while wet performance is ensured, cracks in the groove bottom of the main groove 30 can be more reliably suppressed. As a result, while wet performance is ensured, durability during off-road travel can be improved.

Additionally, the angle θ1 of the first second lug groove 42 is within the range 15°<θ1≤35° and the angle θ2 of the second second lug groove 43 is within the range 25°≤θ2≤55° with respect to the tire width direction, and θ1<θ2 is satisfied. Accordingly, off-road performance, wet performance, and noise performance can be more reliably provided in a compatible manner, and the durability during off-road travel can be improved. That is, when the angle θ1 of the first second lug groove 42 is θ1≤15°, and the angle θ2 of the second second lug groove 43 is θ2<25°, the angle θ1 of the first second lug groove 42 and the angle θ2 of the second second lug groove 43 are too small, and thus the lengths of the first second lug groove 42 and the second second lug groove 43 are possibly difficult to be ensured. Thus, the effects of wet performance and off-road performance by the first second lug groove 42 and the second second lug groove 43 are possibly difficult to be effectively obtained. In addition, in a case where the angle θ1 of the first second lug groove 42 is θ1>35° and the angle θ2 of the second second lug groove 43 is θ2>55°, the angle θ1 of the first second lug groove 42 and the angle θ2 of the second second lug groove 43 are too large. Thus, a portion at which the angle becomes too small possibly occurs at the corner portion where the main groove 30 meets the second lug groove 41 in the second land portion 22. In this case, the portion at which rigidity becomes too small possibly occurs at the corner portion where the main groove 30 meets the second lug groove 41 in the second land portion 22. Due to the low rigidity, damage, such as separation, possibly occurs in the second land portion 22 during off-road travel, such as a rocky area.

In contrast, when the angle θ1 of the first second lug groove 42 is within the range 15°<θ1≤35° and the angle θ2 of the second second lug groove 43 is within the range 25°≤θ2≤55° with respect to the tire width direction, the lengths of the first second lug groove 42 and the second second lug groove 43 can be ensured while too low rigidity at the corner portion where the main grooves 30 intersects with the second lug groove 41 in the second land portion 22 is suppressed. This makes it possible to more reliably improve wet performance and off-road performance while suppressing damage, such as separation, in the second land portion 22. Furthermore, in a case where the angle θ1 of the first second lug groove 42 and the angle θ2 of the second second lug groove 43 with respect to the tire width direction satisfy θ1<θ2, the lengths of the first second lug groove 42 and the second second lug groove 43 can be differentiated, and thus a frequency of air column resonance generated while the second lug groove 41 contacts the ground can be dispersed. Consequently, off-road performance, wet performance, and noise performance can be more reliably provided in a compatible manner, and the durability during off-road travel can be improved.

Further, the first second lug groove 42 has the groove width that widens from the inner side in the tire width direction to the outer side in the tire width direction, and the second second lug groove 43 has the groove width that widens from the outer side in the tire width direction to the inner side in the tire width direction. Thus, the ways of change in groove widths with respect to the tire width direction are in the directions opposite to one another. As a result, air column resonance in the first second lug groove 42 and air column resonance in the second second lug groove 43 can be differentiated, so that a frequency of a sound generated while the second land portions 22 defined by the first second lug grooves 42 and the second second lug grooves 43 contact the ground can be more reliably dispersed. Thus, amplification of the sound at a specific frequency and an increase in sound volume can be more reliably suppressed. As a result, noise performance can be more reliably improved.

Additionally, the first second lug groove 42 has the groove depth that deepens from the inner side in the tire width direction toward the outer side in the tire width direction, and the second second lug groove 43 has the groove depth that deepens from the outer side in the tire width direction toward the inner side in the tire width direction, and thus the ways of change in groove depths with respect to the tire width direction are in the directions opposite to one another. As a result, air column resonance in the first second lug groove 42 and air column resonance in the second second lug groove 43 can be differentiated, so that a frequency of a sound generated while the second land portions 22 defined by the first second lug grooves 42 and the second second lug grooves 43 contact the ground can be more reliably dispersed. As a result, noise performance can be more reliably improved.

Additionally, the relationship between the groove width Wce of the center main groove 31 and the groove width Wsh of the shoulder main groove 32 satisfies Wce≥Wsh. Accordingly, ease of transmission of a sound in the shoulder main groove 32 can be limited, and emission of a sound while the tread ground contact surface 3 contacts the ground to the outside of the vehicle from the shoulder main groove 32 through the shoulder lug groove 45 can be suppressed. That is, the shoulder main groove 32 is disposed on the outer side in the tire width direction of the center main groove 31, and one shoulder main groove 32 among the two shoulder main grooves 32 is disposed on the outermost side in a mounting direction when the pneumatic tire 1 is mounted on a vehicle among the plurality of main grooves 30. Accordingly, when the sound generated while the tread ground contact surface 3 contacts the ground is transmitted to the shoulder main groove 32 disposed on the outermost side in the mounting direction to the vehicle, the sound flows from the shoulder main groove 32 to the shoulder lug groove 45 and is emitted from the shoulder lug groove 45 to the outside of the vehicle, thus being emitted to the outside of the vehicle as a noise. Since the sound emitted outside the vehicle is thus likely to be transmitted to the shoulder main groove 32, the groove width Wsh of the shoulder main groove 32 is set to be less than or equal to the groove width Wce of the center main groove 31 to limit the ease of transmission of a sound in the shoulder main groove 32, thus ensuring suppressing the emission of the sound generated while the tread ground contact surface 3 contacts the ground to the outside of the vehicle. Thus, noise performance can be more reliably improved.

Additionally, since the chamfered portions 48 are formed at the edges of the second lug groove 41 and the shoulder lug groove 45, the durability during off-road travel can be improved. In other words, during off-road travel, by entrance of, for example, pointed portions of rocks into the lug grooves 40 extending in the tire width direction, a large force in the tire circumferential direction acts on the portions defined by the lug grooves 40 in the land portions 20, and so-called chunking, which is a failure of partial separation of the tread portion 2, possibly occurs. In contrast, in the present embodiment, the chamfered portions 48 are formed at the edges of the second lug groove 41 and the shoulder lug groove 45. Thus, the force in the tire circumferential direction acting on the land portion 20 when, for example, a pointed portion of a rock enters the second lug groove 41 or the shoulder lug groove 45 can be alleviated. This makes it possible to suppress partial separation of the tread portion 2 due to the force acting on the land portion 20 from the rock even when, for example, a pointed portion of a rock enters the second lug groove 41 or the shoulder lug groove 45 during off-road travel, thus ensuring suppressing chunking. As a result, the durability during off-road travel can be improved.

Furthermore, the chamfered portions 48 of the second lug groove 41 and the shoulder lug groove 45 have the widths We within the range 0.3 mm≤We≤0.8 mm, and the depths De within the range 0.3 mm≤De≤0.8 mm, and thus noise performance and the durability during off-road travel can be improved. In other words, when the width We or the depth De of the chamfered portion 48 is less than 0.3 mm, the size of the chamfered portion 48 is too small, so even when the chamfered portions 48 are formed at the edges of the second lug groove 41 and the shoulder lug groove 45, the force acting on the land portion 20 when, for example, rocks enter the second lug groove 41 and the shoulder lug groove 45 is possibly difficult to be alleviated. In addition, when the width We or the depth De of the chamfered portion 48 is larger than 0.8 mm, the size of the chamfered portion 48 is too large, and thus the ground contact areas of the land portions 20 defined by the second lug grooves 41 and the shoulder lug grooves 45 are possibly too small. In this case, since a surface pressure while the land portion 20 contacts the ground increases, a hitting sound when the land portion 20 contacts the road surface is likely to increase, and noise performance is possibly likely to degrade.

In contrast, when the widths We or the depths De of the chamfered portions 48 of the second lug groove 41 and the shoulder lug groove 45 are within the range of 0.3 mm or more to 0.8 mm or less, the force acting on the land portions 20 when, for example, a rock enters the second lug groove 41 and the shoulder lug groove 45 can be alleviated while the excessively small ground contact area of the land portions 20 defined by the second lug grooves 41 and the shoulder lug grooves 45 is suppressed. As a result, noise performance and the durability during off-road travel can be more reliably improved.

Additionally, the center land portion 21 is not divided in the tire circumferential direction by the lug grooves 40, and the open sipes 51 having both ends opening to the center main grooves 31 are formed in the center land portion 21. Accordingly, the running performance in a sandy ground and running performance in a rocky area and a mud road can be provided in a compatible manner. In other words, even when the lug groove 40 is formed to ensure off-road performance, in a sandy ground, sand entering the lug groove 40 is easily scraped up from the sandy ground accompanied by the rotation of the pneumatic tire 1. As a result, when the driving force from the drive wheel is transferred to the sandy ground, the pneumatic tire 1 digs the sandy ground while scraping up the sand with the lug grooves 40 and sinks into the sandy ground, possibly making transfer of the driving force difficult.

In contrast, in the present embodiment, since the center land portion 21 is not divided by the lug grooves 40, the ground contact area of the center land portion 21 can be increased, and the ground contact pressure of the tread ground contact surface 3 can be reduced. As a result, even when the driving force from the drive wheel is transferred to a sandy ground, digging of the sandy ground by the pneumatic tire 1 and sinking of the pneumatic tire 1 into the sandy ground can be suppressed. Accordingly, traction performance in a sandy ground can be ensured.

On the other hand, in a case where the center land portion 21 is not separated in the tire circumferential direction by the lug grooves 40, the rigidity of the center land portion 21 is too high. Accordingly, the center land portion 21 is possibly difficult to follow recesses/protrusions of a road surface during traveling on, for example, a rock area or a mud road. In contrast, in the present embodiment, since the open sipes 51 are formed in the center land portion 21, the rigidity of the center land portion 21 can be appropriately reduced, and the center land portion 21 can be deformed in accordance with the recesses/protrusions of the road surface during traveling on, for example, a rock area or a mud road. This allows the center land portion 21 to follow the recesses/protrusions of the road surface and allows ensuring traction performance and steering stability during traveling on, for example, a rocky area and a mud road. Consequently, the running performance in a sandy ground and the running performance in a rocky area and a mud road can be provided in a compatible manner, thus ensuring more reliably improving off-road performance.

Additionally, since the semi-closed sipes 52 are formed in the center land portion 21, the second land portion 22, and the shoulder land portion 23, the rigidity of the land portions 20 can be appropriately reduced, the ground contact pressure can be appropriately reduced, and thus the running performance and the durability during off-road travel can be more reliably improved. In other words, when the rigidity of the land portion 20 is too low, chunking is possibly likely to occur in the tread portion 2 during traveling on a hard road surface having large recesses/protrusions, such as a rocky area. In addition, when the rigidity of the land portion 20 is too high, the land portion 20 is less likely to follow recesses/protrusions of a road surface during traveling on an offroad road surface. Accordingly, running performance during off-road travel is possibly difficult to be ensured. In contrast, in the present embodiment, formation of the semi-closed sipes 52 in the land portions 20 allows appropriately reducing the rigidity of the land portions 20. Thus, while chunking in the tread portion 2 is suppressed, the land portion 20 can follow the recesses/protrusions of the road surface, and the running performance during off-road travel can be ensured.

In addition, in the case where the lug grooves 40 having one end opening to the main groove 30 and the other end terminating in the land portion 20 are formed in the land portion 20, the ground contact area of the land portion 20 becomes small and the ground contact pressure increases.

Accordingly, sinking in the sandy ground is possibly likely to occur during travel on the sandy ground. This possibly makes it difficult to ensure traction performance during traveling on a sandy ground. In contrast, in the present embodiment, in the center land portion 21, the second land portion 22, and the shoulder land portion 23, the semi-closed sipes 52 having one end opening to the main grooves 30 and the other end terminating in the land portions 20 are formed, and thus the excessively small ground contact areas of the land portions 20 can be suppressed. Since this allows suppressing the excessively high ground contact pressure of the land portion 20, digging of the sandy ground by the pneumatic tire 1 and sinking of the pneumatic tire 1 into the sandy ground can be suppressed, and traction performance in a sandy ground can be ensured. Consequently, the running performance and the durability during off-road travel can be more reliably improved.

Additionally, the semi-closed sipe 52 opens to the main groove 30 with the inclination angle in the tire circumferential direction with respect to the tire width direction at the angle within the range of from 0° or more to 30° or less, and thus the traction performance during off-road travel can be more reliably improved. In other words, when the inclination angle of the semi-closed sipe 52 with respect to the tire width direction is larger than 30°, an edge component of the semi-closed sipe 52 with respect to the tire circumferential direction is small, and thus traction performance by the semi-closed sipe 52 in off-road is possibly difficult to be ensured.

In contrast, when the inclination angle of the semi-closed sipe 52 in the tire circumferential direction with respect to the tire width direction is within the range of from 0° or more to 30° or less, the edge component of the semi-closed sipe 52 with respect to the tire circumferential direction can be ensured, and traction performance can be more reliably ensured. In particular, on a rocky area or a mud road, by setting the inclination angle of the semi-closed sipe 52 with respect to the tire width direction to within the range of from 0° or more to 30° or less, when the semi-closed sipes 52 open at the start of moving of the land portion 20, the edge component of the semi-closed sipes 52 can be more reliably exerted with respect to the tire circumferential direction. This allows improving traction performance during travel on an off-road, such as a rocky area and a mud road, at low speed more reliably. As a result, off-road performance can be more reliably improved.

Modified Examples

Note that in the embodiments described above, in the main groove 30, the connection portions 35 connecting the circumferential extending portions 34 adjacent in the tire circumferential direction are inclined in the tire circumferential direction with respect to the tire width direction and extend to form the main grooves 30 in the trapezoidal wave shape. However, the main groove 30 may be formed in a shape other than the trapezoidal wave shape. The main groove 30 may be formed in a rectangular wave shape, for example, by forming the connection portions 35 connecting the circumferential extending portions 34 adjacent in the tire circumferential direction so as to extend substantially parallel to the tire width direction. In addition, the plurality of main grooves 30 may differ in the configuration of the step shape between the main grooves 30. As long as the main groove 30 is formed in the step shape having the circumferential extending portions 34 extending in the tire circumferential direction at the positions where the positions in the tire width direction differ, the detailed shape of the main groove 30 may be any shape.

Additionally, in the embodiment described above, the first second lug groove 42 has the width widened portion 42w on the outer side in the tire width direction of the width narrowed portion 42n, and thus the groove width widens from the inner side in the tire width direction toward the outer side in the tire width direction, but the first second lug groove 42 may change the groove width in a configuration other than that. The first second lug groove 42 may have a widened groove width from the inner side in the tire width direction toward the outer side in the tire width direction without having a step in the groove width direction like the boundary portion between the width narrowed portion 42n and the width widened portion 42w. Similarly, the second second lug groove 43 has the width widened portion 43w on the inner side in the tire width direction of the width narrowed portion 43n, and thus the groove width widens from the outer side in the tire width direction toward the inner side in the tire width direction, but the second second lug groove 43 may also be formed so as not to have a step in the groove width direction and the groove width widens from the outer side in the tire width direction toward the inner side in the tire width direction. The first second lug groove 42 only needs to monotonically increase the groove width from the inner side in the tire width direction toward the outer side in the tire width direction, and the second second lug groove 43 only needs to monotonically increase the groove width from the outer side in the tire width direction toward the inner side in the tire width direction.

In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

EXAMPLES

FIGS. 8A-8D are tables showing results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. In the performance evaluation test, for noise performance during vehicle travel, off-road performance as running performance during off-road travel, and chunking in the tread portion were tested.

The performance evaluation tests were conducted by mounting the pneumatic tire 1 with a tire nominal size of 285/60R18 116V specified by JATMA on a JATMA standard rim wheel with a rim size of 18×8 J, adjusting the air pressure to 230 kPa, mounting the test tires on the evaluation vehicle of a four-wheel-drive SUS vehicle, and then driving the evaluation vehicle.

In the evaluation method for each test item, for noise performance, noise levels at speeds of 60 km/h and 100 km/h on a flat road were evaluated by sensory evaluation by test driver with Conventional Example 1 described below being assigned as the reference 100. Largerindex value of noise performance indicates lower noise during travel on a flat road and superior noise performance.

Also, for off-road performance, running performance during traveling on the respective evaluation road surfaces of a rocky area, a mud road, and a sandy ground was evaluated by sensory evaluation by a test driver, and the total point of the sensory evaluation in the respective evaluation road surfaces was evaluated with Conventional Example 1 described below being assigned as the reference 100. Larger index value of off-road performance indicates higher total point of running performance during travel on the respective evaluation road surfaces and superior off-road performance.

In addition, for chunking, the tread portion of the test tire after conducting the evaluation test for off-road performance was examined, and the number of clear chunkings having ranges and depths of 5 mm or more on the tire circumference was counted. The average number of chunkings per pitch of the tread pattern was calculated from the number of chunkings on the tire circumference thus counted. When the average number of chunkings per pitch was one or more, it was determined that the chunkings were large. When the average number of chunkings per pitch was less than one, it was determined that the chunkings were small.

The performance evaluation tests were conducted on 16 types of pneumatic tires including pneumatic tires according to Conventional Examples 1 to 3 corresponding to an example of conventional pneumatic tires, Examples 1 to 11 corresponding to the pneumatic tires 1 according to the embodiments of the present technology, and Comparative Examples 1 and 2 corresponding to pneumatic tires to be compared with the pneumatic tires 1 according to the embodiments of the present technology. Among them, in Conventional Example 1, second lug grooves having two types of different inclination angles are not provided, and lug grooves do not open to circumferential extending portions located close to the lug grooves of a main groove. Additionally, in Conventional Example 2, inclination directions of a second lug groove and a shoulder lug groove with respect to a tire width direction are in the mutually same direction, two types of second lug grooves having different inclination angles are not provided, and further lug grooves do not open to circumferential extending portions located close to the lug grooves of a main groove. Additionally, in Conventional Example 3, a main groove does not have a zigzag shape extending in a tire circumferential direction and oscillating in a tire width direction, two types of second lug grooves having different inclination angles are not provided, and further lug grooves do not open to circumferential extending portions located close to the lug grooves of a main groove. In addition, in Comparative Example 1, lug grooves do not open to circumferential extending portions located close to the lug grooves of a main groove. Additionally, in Comparative Example 2, two types of second lug grooves having different inclination angles are not provided.

On the other hand, in Examples 1 to 11, which are examples of the pneumatic tires 1 according to the embodiment of the present technology, all of the main grooves 30 have the step shapes, the inclination directions of the second lug groove 41 and the shoulder lug groove 45 with respect to the tire width direction are in opposite directions, the second lug grooves 41 having the different inclination angles are provided, and the lug grooves 40 open to the circumferential extending portions 34 of the main groove 30 located close to the lug grooves 40. Furthermore, each of the ratios of the offset amounts Woff between the circumferential extending portions 34 to the groove widths Wgr of the main grooves 30 (Woff/Wgr), the widths of the see-through portions 37 of the main grooves 30, the angles θ1 of the first second lug grooves 42 and the angles θ2 of the second second lug grooves 43 with respect to the tire width directions, the sides where the groove widths of the first second lug grooves 42 widen, the sides where the groove widths of the second second lug grooves 43 widen, the sides where the groove depths of the first second lug grooves 42 deepen, the sides where the groove depths of the second second lug grooves 43 deepen, the ratios of the groove widths Wsh of the shoulder main grooves 32 to the groove widths Wce of the center main grooves 31 (Wsh/Wce), and presence of the chamfered portions 48 of the lug grooves 40 are differentiated.

As a result of conducting the performance evaluation tests using these pneumatic tires 1, as illustrated in FIGS. 8A-8D, it is found that the pneumatic tires 1 according to Examples 1 to 11 do not decrease in noise performance or off-road performance compared with Conventional Examples 1 to 3 or Comparative Examples 1 and 2, and at least one of the performances can be improved. In other words, the pneumatic tires 1 according to Examples 1 to 11 can provide off-road performance and noise performance in a compatible manner.

The invention claimed is:

1. A tire, comprising:
four main grooves extending in a tire circumferential direction;
a plurality of land portions defined by the four main grooves; and
the four main grooves comprising two center main grooves and two shoulder main grooves, the two center main grooves being disposed on both sides of a tire equatorial plane, the two shoulder main grooves being disposed on outer sides in a tire width direction of the two respective center main grooves,
each of the four main grooves being formed in a step shape having circumferential extending portions extending in the tire circumferential direction at positions differing in the tire width direction,
a second lug groove being disposed between one center main groove of the two center main grooves and one shoulder main groove of the two shoulder main grooves which is adjacent to the one center main groove, the second lug groove extending in the tire width direction and having both ends opening to the one center main groove and the one shoulder main groove,
a shoulder lug groove being disposed on the outer side in the tire width direction of the one shoulder main groove, the shoulder lug groove extending in the tire width direction across a ground contact edge and having one end opening to the one shoulder main groove,
inclination directions of the second lug groove and the shoulder lug groove in the tire circumferential direction with respect to the tire width direction being mutually opposite directions,
in a plurality of the second lug grooves disposed side by side in the tire circumferential direction, two types of the second lug grooves having different inclination angles with respect to the tire width direction being alternately disposed;
the second lug groove opening to the one center main groove and the one shoulder main groove opening to the circumferential extending portions located close to the second lug groove among the circumferential extending portions comprised in respective of the one center main groove and the one shoulder main groove formed in the step shapes,
the shoulder lug groove opening to the one shoulder main groove opening to the circumferential extending portion located close to the shoulder lug groove among the circumferential extending portions comprised in the one shoulder main groove formed in the step shape,
the step shape having two types of the circumferential extending portions having mutually different positions in the tire width direction and a connection portion connecting the two types of the circumferential extending portions adjacent in the tire circumferential direction,
a center line of the step shape forming a rectangular wave or a trapezoidal wave to oscillate,
the connection portion of the shoulder main groove connecting the second lug groove and the shoulder lug groove,
the second lug groove comprising a first second lug groove and a second second lug groove having mutually different inclination angles with respect to the tire width direction and disposed alternately in the tire circumferential direction, and
a relationship between a wavelength $\lambda$ of the step shape of the main grooves and a pitch length P of the second lug groove being within a range $0.4 \leq (\lambda/P) \leq 0.6$, the pitch length P of the second lug groove being a distance in the tire circumferential direction between the first second lug grooves adjacent in the tire circumferential direction.

2. A tire, comprising:
four main grooves extending in a tire circumferential direction;
a plurality of land portions defined by the four main grooves; and
the four main grooves comprising two center main grooves and two shoulder main grooves, the two center main grooves being disposed on both sides of a tire equatorial plane, the two shoulder main grooves being disposed on outer sides in a tire width direction of the two respective center main grooves,
each of the four main grooves being formed in a step shape having circumferential extending portions extending in the tire circumferential direction at positions differing in the tire width direction,
a second lug groove being disposed between one center main groove of the two center main grooves and one shoulder main groove of the two shoulder main grooves which is adjacent to the one center main groove, the second lug groove extending in the tire width direction and having both ends opening to the one center main groove and the one shoulder main groove,
a shoulder lug groove being disposed on the outer side in the tire width direction of the one shoulder main groove, the shoulder lug groove extending in the tire width direction across a ground contact edge and having one end opening to the one shoulder main groove,
inclination directions of the second lug groove and the shoulder lug groove in the tire circumferential direction with respect to the tire width direction being mutually opposite directions,
in a plurality of the second lug grooves disposed side by side in the tire circumferential direction, two types of the second lug grooves having different inclination angles with respect to the tire width direction being alternately disposed;
the second lug groove opening to the one center main groove and the one shoulder main groove opening to the circumferential extending portions located close to the second lug groove among the circumferential extending portions comprised in respective of the one center main groove and the one shoulder main groove formed in the step shapes,
the shoulder lug groove opening to the one shoulder main groove opening to the circumferential extending portion located close to the shoulder lug groove among the circumferential extending portions comprised in the one shoulder main groove formed in the step shape,
the second lug groove comprising a first second lug groove and a second second lug groove having mutually different inclination angles with respect to the tire width direction and disposed alternately in the tire circumferential direction,
the first second lug groove having a groove width that widens from an inner side in the tire width direction toward the outer side in the tire width direction, the second second lug groove having a groove width that widens from the outer side in the tire width direction toward the inner side in the tire width direction, and a relationship between a wavelength λ of the step shape of the main grooves and a pitch length P of the second lug groove being within a range 0.4≤(λ/P)≤0.6, the pitch length P of the second lug groove being a distance in the tire circumferential direction between the first second lug grooves adjacent in the tire circumferential direction.

3. A tire, comprising:

four main grooves extending in a tire circumferential direction;

a plurality of land portions defined by the four main grooves; and the four main grooves comprising two center main grooves and two shoulder main grooves, the two center main grooves being disposed on both sides of a tire equatorial plane, the two shoulder main grooves being disposed on outer sides in a tire width direction of the two respective center main grooves, each of the four main grooves being formed in a step shape having circumferential extending portions extending in the tire circumferential direction at positions differing in the tire width direction, a second lug groove being disposed between one center main groove of the two center main grooves and one shoulder main groove of the two shoulder main grooves which is adjacent to the one center main groove, the second lug groove extending in the tire width direction and having both ends opening to the one center main groove and the one shoulder main groove, a shoulder lug groove being disposed on the outer side in the tire width direction of the one shoulder main groove, the shoulder lug groove extending in the tire width direction across a ground contact edge and having one end opening to the one shoulder main groove, inclination directions of the second lug groove and the shoulder lug groove in the tire circumferential direction with respect to the tire width direction being mutually opposite directions, in a plurality of the second lug grooves disposed side by side in the tire circumferential direction, two types of the second lug grooves having different inclination angles with respect to the tire width direction being alternately disposed;

the second lug groove opening to the one center main groove and the one shoulder main groove opening to the circumferential extending portions located close to the second lug groove among the circumferential extending portions comprised in respective of the one center main groove and the one shoulder main groove formed in the step shapes, the shoulder lug groove opening to the one shoulder main groove opening to the circumferential extending portion located close to the shoulder lug groove among the circumferential extending portions comprised in the one shoulder main groove formed in the step shape, no lug grooves extending in the tire width direction and having both ends opening to the center main groove and the shoulder main groove being disposed between circumferentially adjacent second lug grooves, the second lug groove comprising a first second lug groove and a second second lug groove having mutually different inclination angles with respect to the tire width direction and disposed alternately in the tire circumferential direction, and a relationship between a wavelength λ of the step shape of the main grooves and a pitch length P of the second lug groove being within a range 0.4≤(λ/P)≤0.6, the pitch length P of the second lug groove being a distance in the tire circumferential direction between the first second lug grooves adjacent in the tire circumferential direction.

4. The tire according to claim 3, wherein the four main grooves have a width Ws in the tire width direction of a see-through portion as a portion through which it is seen within a range 1 mm<Ws≤4 mm in an extension direction view of the four main grooves.

5. The tire according to claim 3, wherein in the one center main groove and the one shoulder main groove, a relationship between a groove width Wce of the one center main groove and a groove width Wsh of the one shoulder main groove satisfies Wce≥Wsh.

6. The tire according to claim 3, wherein
chamfered portions are formed at edges of the second lug groove and the shoulder lug groove, and
the chamfered portion has a width We within a range 0.3 mm≤We≤0.8 mm and a depth De within a range 0.3 mm≤De≤0.8 mm.

7. The tire according to claim 3, wherein the second lug groove comprises a first second lug groove and a second second lug groove having mutually different inclination angles with respect to the tire width direction and disposed alternately in the tire circumferential direction, and the first second lug groove and the second second lug groove are inclined in the same direction with respect to the tire width direction.

8. The tire according to claim 3, wherein
the second lug groove comprises a first second lug groove and a second second lug groove having mutually different inclination angles with respect to the tire width direction and disposed alternately in the tire circumferential direction,
the first second lug groove has an angle θ1 with respect to the tire width direction within a range 15°<θ1≤35°,
the second lug groove has an angle θ2 with respect to the tire width direction within a range 25°≤θ2≤55°, and
the angle θ1 of the first second lug groove and the angle θ2 of the second second lug groove with respect to the tire width direction satisfy θ1<θ2.

9. The tire according to claim 8, wherein
the first second lug groove has a groove width that widens from an inner side in the tire width direction toward the outer side in the tire width direction, and
the second second lug groove has a groove width that widens from the outer side in the tire width direction toward the inner side in the tire width direction.

10. The tire according to claim 8, wherein
the first second lug groove has a groove depth that deepens from an inner side in the tire width direction toward the outer side in the tire width direction, and
the second second lug groove has a groove depth that deepens from the outer side in the tire width direction toward the inner side in the tire width direction.

11. The tire according to claim 3, wherein
a plurality of the land portions comprise a center land portion disposed between the two center main grooves, a second land portion disposed between the one center main groove and the one shoulder main groove adjacent in the tire width direction, and a shoulder land portion disposed on the outer side in the tire width direction of the one shoulder main groove, and in the center land portion, an open sipe having both ends opening to the two center main grooves is formed.

12. The tire according to claim 11, wherein semi-closed sipes are formed in the center land portion, the second land portion, and the shoulder land portion, and the semi-closed sipes each have one end opening to one of the four main grooves and another end terminating in one of the center land portion, the second land portion, or the shoulder land portion.

13. The tire according to claim 12, wherein the semi-closed sipes open to the four main grooves with an inclination angle in the tire circumferential direction with respect to the tire width direction at an angle within a range of from 0° or more to 30° or less.

14. The tire according to claim 3, wherein the four main grooves have an offset amount Woff in the tire width direction between the circumferential extending portions having the different positions in the tire width direction within a range $0.3 \leq (Woff/Wgr) \leq 0.8$ with respect to a groove width Wgr of the four main grooves.

15. The tire according to claim 14, wherein the four main grooves have a width Ws in the tire width direction of a see-through portion as a portion through which it is seen within a range $1 \text{ mm} < Ws \leq 4 \text{ mm}$ in an extension direction view of the four main grooves.

16. The tire according to claim 15, wherein the second lug groove comprises a first second lug groove and a second second lug groove having mutually different inclination angles with respect to the tire width direction and disposed alternately in the tire circumferential direction, the first second lug groove has an angle θ1 with respect to the tire width direction within a range $15° < θ1 \leq 35°$, the second second lug groove has an angle θ2 with respect to the tire width direction within a range $25° \leq θ2 \leq 55°$, and the angle θ1 of the first second lug groove and the angle θ2 of the second second lug groove with respect to the tire width direction satisfy $θ1 < θ2$.

17. The tire according to claim 16, wherein the first second lug groove has a groove width that widens from an inner side in the tire width direction toward the outer side in the tire width direction, and the second second lug groove has a groove width that widens from the outer side in the tire width direction toward the inner side in the tire width direction.

18. The tire according to claim 17, wherein the first second lug groove has a groove depth that deepens from an inner side in the tire width direction toward the outer side in the tire width direction, and the second second lug groove has a groove depth that deepens from the outer side in the tire width direction toward the inner side in the tire width direction.

19. The tire according to claim 18, wherein in the one center main groove and the one shoulder main groove, a relationship between a groove width Wce of the one center main groove and a groove width Wsh of the one shoulder main groove satisfies $Wce \geq Wsh$.

20. The tire according to claim 19, wherein chamfered portions are formed at edges of the second lug groove and the shoulder lug groove, and the chamfered portion has a width We within a range $0.3 \text{ mm} \leq We \leq 0.8 \text{ mm}$ and a depth De within a range $0.3 \text{ mm} \leq De \leq 0.8 \text{ mm}$.

21. The tire according to claim 20, wherein a plurality of the land portions comprise a center land portion disposed between the two center main grooves, a second land portion disposed between the one center main groove and the one shoulder main groove adjacent in the tire width direction, and a shoulder land portion disposed on the outer side in the tire width direction of the one shoulder main groove, and in the center land portion, an open sipe having both ends opening to the two center main grooves is formed.

22. The tire according to claim 21, wherein semi-closed sipes are formed in the center land portion, the second land portion, and the shoulder land portion, and the semi-closed sipes each have one end opening to one of the four main grooves and another end terminating in one of the center land portion, the second land portion, or the shoulder land portion.

23. The tire according to claim 22, wherein the semi-closed sipes open to the four main grooves with an inclination angle in the tire circumferential direction with respect to the tire width direction at an angle within a range of from 0° or more to 30° or less.

* * * * *